United States Patent
Ohlsson et al.

(10) Patent No.: US 12,137,379 B2
(45) Date of Patent: Nov. 5, 2024

(54) METHODS PROVIDING TRANSMISSION OF UL DATA TO A SOURCE ACCESS NODE AFTER ESTABLISHING CONNECTION WITH A TARGET ACCESS NODE AND RELATED WIRELESS DEVICES

(71) Applicant: Telefonaktiebolaget LM Ericsson (publ), Stockholm (SE)

(72) Inventors: Oscar Ohlsson, Bromma (SE); Pontus Wallentin, Linköping (SE); Johan Rune, Lidingö (SE); Julien Muller, Rennes (FR); Alexander Vesely, Feldbach (AT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 228 days.

(21) Appl. No.: 17/628,805

(22) PCT Filed: Aug. 13, 2020

(86) PCT No.: PCT/SE2020/050781
§ 371 (c)(1),
(2) Date: Jan. 20, 2022

(87) PCT Pub. No.: WO2021/029818
PCT Pub. Date: Feb. 18, 2021

(65) Prior Publication Data
US 2022/0361053 A1  Nov. 10, 2022

Related U.S. Application Data

(60) Provisional application No. 62/887,576, filed on Aug. 15, 2019.

(51) Int. Cl.
*H04W 36/00*  (2009.01)
*H04W 36/02*  (2009.01)
*H04W 36/18*  (2009.01)

(52) U.S. Cl.
CPC ..... *H04W 36/0016* (2013.01); *H04W 36/023* (2013.01); *H04W 36/18* (2013.01)

(58) Field of Classification Search
CPC .......... H04W 36/0016; H04W 36/023; H04W 36/18; H04W 36/00695; H04W 36/0235
See application file for complete search history.

(56) References Cited

U.S. PATENT DOCUMENTS

| | | | |
|---|---|---|---|
| 2022/0201573 A1* | 6/2022 | Tsuboi | H04W 36/0044 |
| 2022/0240142 A1* | 7/2022 | Jo | H04W 36/023 |
| 2022/0303840 A1* | 9/2022 | Chang | H04W 36/0072 |

FOREIGN PATENT DOCUMENTS

| | | |
|---|---|---|
| CN | 101132640 A | 2/2008 |
| CN | 108702673 A | 10/2018 |
| WO | 2017152757 A1 | 9/2017 |

OTHER PUBLICATIONS

"3GPP TS 36.133 V15.7.0", 3rd Generation Partnership Project; Technical Specification Group Radio Access Network; Evolved Universal Terrestrial Radio Access (E-UTRA); Requirements for support of radio resource management (Release 15), Jun. 2019, pp. 1-3601.

(Continued)

*Primary Examiner* — Hashim S Bhatti
(74) *Attorney, Agent, or Firm* — Weisberg I.P. Law, P.A.

(57) ABSTRACT

A method of operating a wireless device (300) is described. The method includes providing (1001) a connection with a source access node. The method also includes receiving (1005) a handover command from the source access node while providing the connection with the source access node. The method also includes establishing (1009) a connection with a target access node responsive to receiving the handover command. The method further includes transmitting (1019) uplink data to the source access node after establishing the connection with the target access node. Related wireless devices are also discussed.

17 Claims, 21 Drawing Sheets

(56) References Cited

OTHER PUBLICATIONS

"3GPP TS 36.300 V15.6.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Jun. 2019, pp. 1-365.

"3GPP TS 36.331 V15.6.0", 3rd Generation Partnership Project; Technical Specification Group Radio Access Network; Evolved Universal Terrestrial Radio Access (E-UTRA); Radio Resource Control (RRC); Protocol specification (Release 15), Jun. 2019, pp. 1-960.

"Consideration on UL New Data Transmission for Single PDCP Entity", 3GPP TSG-RAN WG2 Meeting #106, R2.1906641, Reno, USA, May 13-17, 2019, pp. 1-4.

"Discussion on data forwarding in mobility enhancement solutions", 3GPP TSG-RAN WG3 Meeting #92, R3-161144, Nanjing, China, May 23-27, 2016, pp. 1-5.

"Maintaining Source eNB Connection during Handover", 3GPP TSG-RAN3 Meeting #91-bis, R3-160636, Bangalore, India, Apr. 11-15, 2016, pp. 1-4.

"Uplink handling during handover with simultaneous connectivity", 3GPP TSG-RAN WG2 #107, Tdoc R2-1908971, Prague, Czech Republic, Aug. 26-30, 2019, pp. 1-5.

"3GPP TS 38.300 V15.6.0", 3rd Generation Partnership Project; Technical Specification Group Radio Access Network; NR; NR and NG-RAN Overall Description; Stage 2 (Release 15), Jun. 2019, pp. 1-99.

"3GPP TR 36.881 V14.0.0", 3rd Generation Partnership Project; Technical Specification Group Radio Access Network; Evolved Universal Terrestrial Radio Access (E-UTRA); Study on latency reduction techniques for LTE (Release 14), Jun. 2016, pp. 1-249.

Chinese Office Action and Search Report with English machine translation dated Mar. 18, 2024 for Patent Application No. 202080057311.5, consisting of 20 pages.

\* cited by examiner

METHODS PROVIDING TRANSMISSION OF UL DATA TO A SOURCE ACCESS NODE AFTER ESTABLISHING CONNECTION WITH A TARGET ACCESS NODE AND RELATED WIRELESS DEVICES

TECHNICAL FIELD

The present disclosure relates generally to communications, and more particularly to communication methods and related wireless devices and nodes supporting wireless communications.

BACKGROUND

Wireless communication systems in 3GPP are discussed below.

In the wireless communication system illustrated in FIG. 1, a User Equipment UE (102) communicates with one or multiple access nodes (103-104), which in turn are connected to a network node (106). The access nodes 103-104 are part of the radio access network 100.

FIG. 1 is a diagram illustrating a wireless communication system.

For wireless communication systems pursuant to 3GPP Evolved Packet System, EPS (also referred to as Long Term Evolution, LTE, or 4G) standard specifications, such as specified in 3GPP TS 36.300 and related specifications, the access nodes 103-104 correspond typically to an Evolved NodeB (eNB) and the network node 106 corresponds typically to either a Mobility Management Entity (MME) and/or a Serving Gateway (SGW). The eNB is part of the radio access network 100, which in this case is the E-UTRAN (Evolved Universal Terrestrial Radio Access Network), while the MME and SGW are both part of the EPC (Evolved Packet Core network). The eNBs are inter-connected via the X2 interface, and connected to EPC via the S1 interface, more specifically via S1-C to the MME and S1-U to the SGW.

For wireless communication systems pursuant to 3GPP 5G System, 5GS (also referred to as New Radio, NR, or 5G) standard specifications, such as specified in 3GPP TS 38.300 and related specifications, on the other hand, the access nodes 103-104 correspond typically to a 5G NodeB (gNB) and the network node 106 corresponds typically to either a Access and Mobility Management Function (AMF) and/or a User Plane Function (UPF). The gNB is part of the radio access network 100, which in this case is the NG-RAN (Next Generation Radio Access Network), while the AMF and UPF are both part of the 5G Core Network (5GC). The gNBs are inter-connected via the Xn interface, and connected to 5GC via the NG interface, more specifically via NG-C to the AMF and NG-U to the UPF.

To support fast mobility between NR and LTE and reduce/avoid change of core network, LTE eNBs can also be connected to the 5G-CN via NG-U/NG-C and support the Xn interface. An eNB connected to 5GC is called a next generation eNB (ng-eNB) and is considered part of the NG-RAN. LTE connected to 5GC will not be discussed further in this document; however, it should be noted that most of the solutions/features/approaches described for LTE and NR in this document also apply to LTE connected to 5GC. In this document, when the term LTE is used without further specification it refers to LTE-EPC.

Mobility in RRC_CONNECTED in LTE and NR is discussed below.

Mobility in RRC_CONNECTED state is also known as handover. The purpose of handover is to move the UE, due to e.g. mobility, from a source access node using a source radio connection, to a target access node, using a target radio connection. The source radio connection is associated with a source cell controlled by the source access node. The target radio connection is associated with a target cell controlled by the target access node. So in other words, during a handover, the UE moves from the source cell to a target cell. Sometimes the source access node or the source cell is referred to as the "source", and the target access node or the target cell is sometimes referred to as the "target".

In some cases, the source access node and target access node are different nodes, such as different eNBs or gNBs. These cases are also referred to as inter-node handover, inter-eNB handover or inter-gNB handover. In other cases, the source access node and target access node are the same node, such as the same eNB and gNB. These cases are also referred to as intra-node handover, intra-eNB handover or intra-gNB handover and cover the case that source and target cells are controlled by the same access node. In yet other cases, handover is performed within the same cell (and thus also within the same access node controlling that cell)—these cases are also referred to as intra-cell handover.

It should therefore be understood that the terms source access node and target access node refer to a role served by a given access node during a handover of a specific UE. For example, a given access node may serve as source access node during handover of one UE, while it also serves as the target access node during handover of a different UE. And, in case of an intra-node or intra-cell handover of a given UE, the same access node serves both as the source access node and target access node for that UE.

An RRC_CONNECTED UE in E-UTRAN or NG-RAN can be configured by the network to perform measurements of serving and neighbor cells and based on the measurement reports sent by the UE, the network may decide to perform a handover of the UE to a neighbor cell. The network then sends a Handover Command message to the UE (in LTE an RRConnectionReconfiguration message with a field called mobilityControlInfo and in NR an RRCReconfiguration message with a reconfigurationWithSync field).

These reconfigurations are actually prepared by the target access node upon a request from the source access node (over X2 or S1 interface in case of EUTRA-EPC or Xn or NG interface in case of NG-RAN-5GC) and takes into account the existing RRC configuration and UE capabilities as provided in the request from the source access node and its own capabilities and resource situation in the intended target cell and target access node. The reconfiguration parameters provided by the target access node contains, for example, information used/needed by the UE to access the target access node, e.g., random access configuration, a new C-RNTI assigned by the target access node and security parameters enabling the UE to calculate new security keys associated to the target access node so the UE can send a Handover Complete message (in LTE an RRConnectionReconfiguratioComplete message and in NR an RRCReconfigurationComplete message) on SRB1 encrypted and integrity protected based on new security keys upon accessing the target access node.

FIGS. 2A and 2B provide a message diagram summarizing signaling flows between UE, source access node (also known as source gNB, source eNB or source cell) and target access node (also known as target gNB, target eNB or target cell) during a handover HO procedure, using LTE as an example.

FIGS. 2A and 2B provide a message diagram illustrating Handover in LTE.

User plane handling during handover is discussed below.

Depending on the required Quality of Service QoS, either a seamless or a lossless handover is performed as appropriate for each user plane radio bearer, as explained in the following subsections.

Seamless handover is discussed below.

Seamless handover is applied for user plane radio bearers mapped on RLC Unacknowledged Mode (UM). These types of data are typically reasonably tolerant of losses but less tolerant of delay (e.g. voice services). Seamless handover is therefore designed to reduce/minimize complexity and delay, but may result in loss of some PDCP SDUs.

At handover, for radio bearers to which seamless handover applies, the PDCP entities including the header compression contexts are reset, and the COUNT values are set to zero. As a new key is anyway generated at handover, there is no security reason to maintain the COUNT values. PDCP SDUs in the UE for which the transmission has not yet started will be transmitted after handover to the target access node. In the source access node, PDCP SDUs that have not yet been transmitted can be forwarded via the X2/Xn interface to the target access node. PDCP SDUs for which the transmission has already started but that have not been successfully received will be lost. This may reduce/minimize the complexity because no context (i.e. configuration information) has to be transferred between the source access node and the target access node at handover.

Lossless handover is discussed below.

Based on the SN that is added to PDCP Data PDUs it is possible to ensure in-sequence delivery during handover, and even provide a fully lossless handover functionality, performing retransmission of PDCP SDUs for which reception has not yet been acknowledged prior to the handover. This lossless handover function is used mainly for delay-tolerant services such as file downloads where the loss of one PDCP SDU can result in a drastic reduction in the data rate due to the reaction of the Transmission Control Protocol (TCP).

Lossless handover is applied for user plane radio bearers that are mapped on RLC Acknowledged Mode (AM). When RLC AM is used, PDCP SDUs that have been transmitted but not yet been acknowledged by the RLC layer are stored in a retransmission buffer in the PDCP layer.

In order to ensure lossless handover in the downlink (DL), the source access node forwards the DL PDCP SDUs stored in the retransmission buffer as well as fresh DL PDCP SDUs received from the gateway to the target access node for (re-)transmission. The source access node receives an indication from the gateway that indicates the last packet sent to the source access node (a so called "end marker" packet). The source access node also forwards this indication to the target access node 104 so that the target access node knows when it can start transmission of packets received from the gateway.

In order to ensure lossless handover in the uplink (UL), the UE retransmits the UL PDPC SDUs that are stored in the PDCP retransmission buffer. The retransmission is triggered by the PDCP re-establishment that is performed upon reception of the handover command. The source access node, after decryption and decompression, will forward all PDCP SDUs received out of sequence to the target access node. Thus, the target access node 104 can reorder the PDCP SDUs received from the source access node 103 and the retransmitted PDCP SDUs received from the UE based on the PDCP SNs which are maintained during the handover, and deliver them to the gateway in the correct sequence.

An additional feature of lossless handover is so-called selective re-transmission. In some cases it may happen that a PDCP SDU has been successfully received, but a corresponding RLC acknowledgement has not. In this case, after the handover, there may be unnecessary retransmissions initiated by the UE or the target access node based on the incorrect status received from the RLC layer. In order to reduce/avoid these unnecessary retransmissions a PDCP status report can be sent from the target access node to the UE and from the UE to the target access node. Whether to send a PDCP status report after handover is configured independently for each radio bearer and for each direction.

Rel-14 Make-Before-Break handover is discussed below.

Handover interruption time is typically defined as the time from when the UE stops transmission/reception with the source access node until the target access node resumes transmission/reception with the UE.

In LTE pre-Rel-14, according to 3GPP TR 36.881, the handover interruption time may be at least 45 ms. In LTE and NR, different approaches to decrease the handover interruption time have since then been discussed. Improvements are driven for example by new service requirements on low latency (e.g. aerial, industrial automation, industrial control) for which low interruption time shall be guaranteed.

As an example of one such improvement, Make-Before-Break (MBB) was introduced in LTE Rel-14 to shorten handover interruption time as close to 0 ms as possible as shown in FIGS. 3A and 3B.

The MBB handover procedure as introduced in LTE Rel-14, refers to a handover mechanism where the UE connects to the target cell before disconnecting from the source cell unlike the standard handover procedure where the UE resets MAC and re-establishes RLC and PDCP upon receiving the Handover Command message (RRCConnectionReconfiguration message with mobilityControlInfo) in the source cell. The mobilityControlInfo in the RRCConnectionReconfiguration message includes a field makeBeforeBreak, to instruct the UE 102 to keep the connection to the source cell 103. From 3GPP TS 36.331:

makeBeforeBreak
Indicates that the UE shall continue uplink transmission/downlink reception with the source cell(s) before performing the first transmission through PRACH to the target intra-frequency PCell, or performing initial PUSCH transmission to the target intra-frequency PCell while rach-Skip is configured.

NOTE 1a: It is up to UE implementation when to stop the uplink transmission/downlink reception with the source cell(s) to initiate re-tuning for connection to the target cell, as specified in TS 36.133 [16], if makeBeforeBreak is configured.

In the MBB approach, the connection to the source cell is maintained after the reception of Handover Command until the UE executes initial UL transmission in the target cell, i.e. MAC reset and RLC and PDCP re-establishment is delayed in the UE until the UE performs random-access in the target cell or, if MBB is combined with RACH-less handover (i.e. rach-Skip is present in the mobilityControlInfo), until the UE performs the initial PUSCH transmission. Depending on the UE capabilities (e.g.) It is up to UE implementation when to stop the UL transmission/DL reception with the source cell to initiate re-tuning for connection to the target cell.

At the point when the source eNB has stopped transmission/reception to/from the UE, the source eNB sends the SN STATUS TRANSFER message (operation 8) to the target eNB to convey the uplink PDCP SN receiver status and the downlink PDCP SN transmitter status of the radio bearers for which PDCP status preservation applies.

MBB as specified in LTE Rel-14 (3GPP TS 36.300 and TS 36.331) has some known limitations: Even if MBB and other improvements, such as RACH-less handover are combined it is still not possible to reach ~0 ms handover interruption time. MBB in Rel-14 is only supported for intra-frequency handovers and assumes the UE is equipped with a single Rx/Tx chain. In an intra-frequency handover scenario, a single Rx UE is capable of receiving from both target and source cell simultaneously, however, a single Tx UE will not be able to transmit to both cells simultaneously. Thus, in MBB Rel-14, the UE will release the connection to the source cell before the first UL transmission. This occurs when the UE transmits the RACH preamble; or transmits the Handover Complete message (if RACH-less HO is configured).

Consequently, the UE releases the connection with the source cell before the connection with the target cell is ready for packet transmission/reception which results in interruption time of ~5 ms.

Rel-16 Enhanced Make-Before-Break (eMBB) is discussed below.

To address the shortcomings of Rel-14 MBB and achieve ~0 ms interruption time an enhanced version of Make-Before-Break (eMBB) is being discussed for Rel-16 both for LTE and NR. In this enhanced version it is assumed that the UE is capable of simultaneously transmitting and receiving from the source and target cell. In practice, this may require that the UE is equipped with dual Tx/Rx chains. The dual Tx/Rx chains potentially also allows eMBB to be supported in other handover scenarios such as inter-frequency handover.

An example of an eMBB inter-node handover is illustrated in FIGS. 4A and 4B for the case of LTE.

FIGS. 4A and 4B provide a message diagram illustrating Enhanced Make-Before-Break (eMBB) for LTE. Some highlights in this approach may include:

In operation 405, upon receiving the "eMBB" indication in the Handover Command, the UE maintains the connection to the source access node while establishing the connection to the target access node. That is, the UE can send and receive DL/UL user plane data via the source access node between operations 405-408 without any interruption. And after operation 408, UE has the target link available for UL/DL user plane data transmission similar to the regular HO procedure.

In operation 406, the source access node sends an SN status transfer message to the target access node, indicating UL PDCP receiver status, the SN of the first forwarded DL PDCP SDU. The uplink PDCP SN receiver status includes at least the PDCP SN of the first missing UL SDU and may include a bit map of the receive status of the out of sequence UL SDUs that the UE needs to retransmit in the target cell, if there are any such SDUs. The SN Status Transfer message also contains the Hyper Frame Number (HFN) of the first missing UL SDU as well as the HFN DL status for COUNT preservation in the target access node.

Once the connection setup with the target access node is successful, i.e. after sending the Handover Complete message in operation 408, the UE maintains two data links, one to the source access node and one to the target access node. After operation 408, UE transmits the UL user plane data on the target access node similar to the regular HO procedure using the target access node security keys and compression context. Thus there is no need for UL user plane data transmission to both nodes which reduces/avoids UE power splitting between two nodes and also simplifies UE implementation. In the case of intra-frequency handover, transmitting UL user plane data to one node at a time also reduces UL interference which increases the chance of successful decoding at the network side.

The UE may need to maintain the security and compression context for both source access node and target access node until the source link is released. UE can differentiate the security/compression context to be used for a PDCP PDU based on the cell which the PDU is transmitted on.

To reduce/avoid packet duplication, the UE may send a PDCP status report together with the Handover Complete message in operation 408, indicating the last received PDCP SN. Based on the PDCP status report, the target access node can reduce/avoid sending duplicate PDCP packets (i.e. PDCP PDUs with identical sequence numbers) to the UE, i.e. PDCP packets which were already received by the UE in the source cell.

The release of the source cell in operation 413 can e.g. be triggered by an explicit message from the target access node (not shown in the figure) or by some other event such as the expiry of a release timer.

As an alternative to source access node starting packet data forwarding after operation 405 (i.e. after sending the Handover Command to the UE), the target access node may indicate to the source access node when to start packet data forwarding. For instance, the packet data forwarding may start at a later stage when the link to the target cell has been established, e.g. after the UE has performed random access in the target cell. By starting the packet data forwarding in the source access node at a later stage, the number of duplicated PDCP SDUs received by the UE from the target cell will potentially be less and by that the DL latency will be somewhat reduced. However, starting the packet data forwarding at a later stage is also a trade-off between robustness and reduced latency if, e.g., the connection between the UE and the source access node is lost before the connection to the target access node is established. In such case there will be a short interruption in the DL data transfer to the UE.

FIG. 5 illustrates a User plane stack for Enhanced Make-Before-Break (eMBB) and shows the protocol stack at the UE side in eMBB. Each user plane radio bearer has an associated PDCP entity which in turn has two associated RLC entities—one for the source cell and one for the target cell. The PDCP entity uses different security keys and ROHC contexts for the source and target cell while the SN allocation (for UL transmission) and re-ordering/duplication detection (for DL reception) is common.

Note that in case of NR, there is an additional protocol layer called SDAP on top of PDCP which is responsible for mapping QoS flows to bearers. This layer is not shown in FIG. 5 and will not be discussed further in this document.

Existing handover operations, however, may not adequately handle uplink data that has been submitted to the RLC entity in the UE for the source cell (also here denoted as "the source RLC entity") but not yet acknowledged by the source access node.

SUMMARY

According to some embodiments of the present disclosure, a method of operating a wireless device is described.

The method includes providing a connection with a source access node. The method also includes receiving a handover command from the source access node while providing the connection with the source access node. The method also includes establishing a connection with a target access node responsive to receiving the handover command. The method further includes transmitting uplink data to the source access node after establishing the connection with the target access node.

According to some other embodiments of the present disclosure, a wireless device including processing circuitry and memory coupled with the processing circuitry is described. The memory includes instructions that when executed by the processing circuitry causes the wireless device to provide a connection with a source access node. The memory also includes instructions that when executed by the processing circuitry causes the wireless device to receive a handover command from the source access node while providing the connection with the source access node. The memory also includes instructions that when executed by the processing circuitry causes the wireless device to establish a connection with a target access node responsive to receiving the handover command. The memory also includes instructions that when executed by the processing circuitry causes the wireless device to transmit uplink data to the source access node after establishing the connection with the target access node According to still other embodiments of the present disclosure, a wireless device adapted to provide a connection with a source access node according to some embodiments is also described. The wireless device is also adapted to receive a handover command from the source access node while providing the connection with the source access node. The wireless device is also adapted to establish a connection with a target access node responsive to receiving the handover command. The wireless device is further adapted to transmit uplink data to the source access node after establishing the connection with the target access node.

According to some embodiments of inventive concepts, handling of uplink data may be improved during handover by providing uplink data transmission to the source access node after establishing connection with the target access node (e.g., after Uplink UL switch from the source access node to the target access node). For example, the uplink data may include uplink data stored in a transmission buffer of the source RLC entity of the wireless device (e.g., PDCP data received by the source RLC entity before establishing the connection with the target node) that is transmitted to the source access node after establishing the connection with the target access node, and/or the uplink data may include a PDCP control PDU (e.g., a Robust Header Compression feedback PDU) that is transmitted to the source access node after establishing the connection with the target access node. Accordingly, uncertainty as to how re-transmission of unacknowledged uplink service data units, SDUs, are handled may be reduced, and/or reliability of such re-transmissions may be improved.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 7:
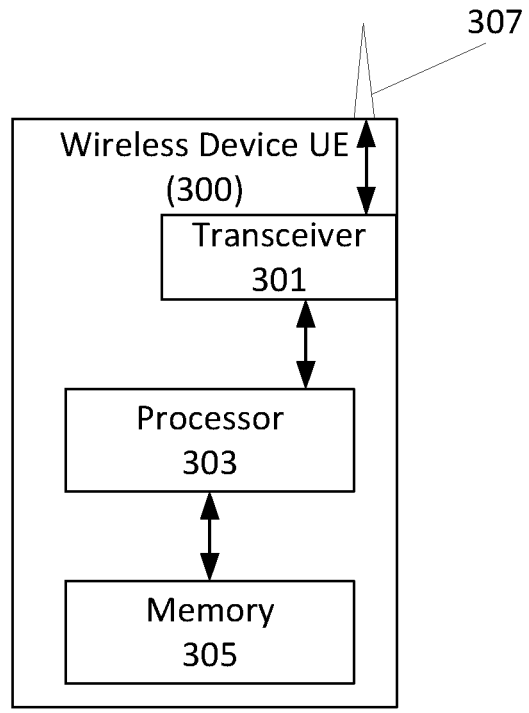
FIG. 7 is a block diagram illustrating a wireless device UE according to some embodiments of inventive concepts.

FIG. 7 is a block diagram illustrating elements of a wireless device UE 300 (also referred to as a mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of inventive concepts. (Wireless device 300 may be provided, for example, as discussed below with respect to wireless device QQ110 of FIG. 11.) As shown, wireless device UE may include an antenna 307 (e.g., corresponding to antenna QQ111 of FIG. 11), and transceiver circuitry 301 (also referred to as a transceiver, e.g., corresponding to interface QQ114 of FIG. 11) including a transmitter and a receiver configured to provide uplink and downlink radio communications with a base station(s) (e.g., corresponding to network node QQ160 of FIG. 11, also referred to as a RAN node) of a radio access network. Wireless device UE may also include processing circuitry 303 (also referred to as a processor, e.g., corresponding to processing circuitry QQ120 of FIG. 11) coupled to the transceiver circuitry, and memory circuitry 305 (also referred to as memory, e.g., corresponding to device readable medium QQ130 of FIG. 11) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Wireless device UE may also include an interface (such as a user interface) coupled with processing circuitry 303, and/or wireless device UE may be incorporated in a vehicle.

As discussed herein, operations of wireless device UE may be performed by processing circuitry 303 and/or transceiver circuitry 301. For example, processing circuitry 303 may control transceiver circuitry 301 to transmit communications through transceiver circuitry 301 over a radio interface to a radio access network node/nodes (also referred to as a base station or access node) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless devices).

Figure 8:
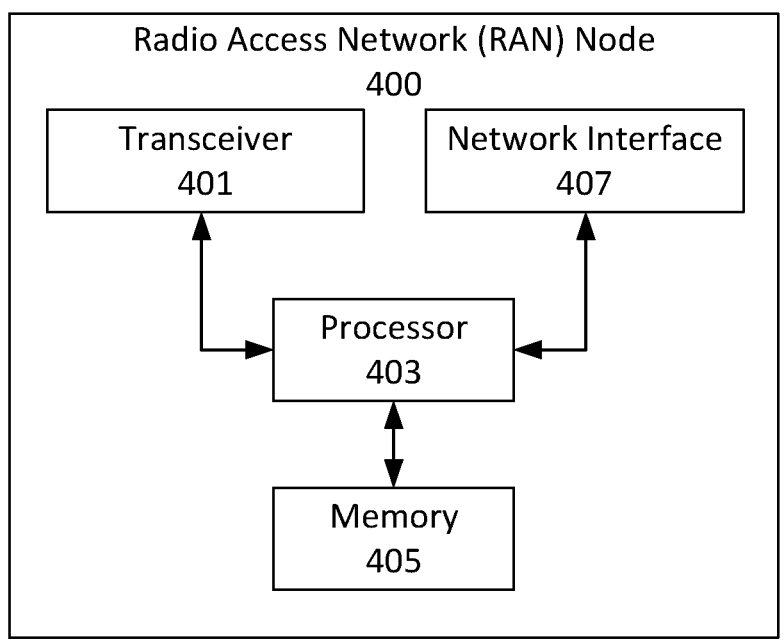
FIG. 8 is a block diagram illustrating a radio access network RAN node (e.g., a base station eNB/gNB) according to some embodiments of inventive concepts.

FIG. 8 is a block diagram illustrating elements of a radio access network RAN node 400 (also referred to as a network node, access node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node QQ160 of FIG. 11.) As shown, the RAN node may include transceiver circuitry 401 (also referred to as a transceiver, e.g., corresponding to portions of interface QQ190 of FIG. 11) including a transmitter and a receiver configured to provide uplink and downlink radio communications with mobile terminals. The RAN node may include network interface circuitry 407 (also referred to as a network interface, e.g., corresponding to portions of interface QQ190 of FIG. 11) configured to provide communications with other nodes (e.g., with other base stations) of the RAN and/or core network CN. The network node may also include processing circuitry 403 (also referred to as a processor, e.g., corresponding to processing circuitry QQ170) coupled to the transceiver circuitry, and memory circuitry 405 (also referred to as memory, e.g., corresponding to device readable medium QQ180 of FIG. 11) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations.

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 9:
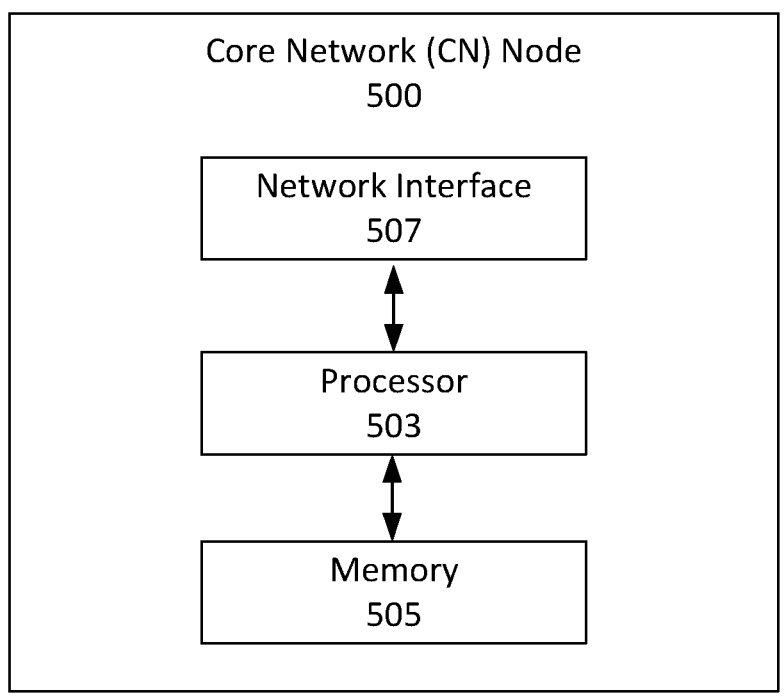
FIG. 9 is a block diagram illustrating a core network CN node (e.g., an AMF node, an SMF node, etc.) according to some embodiments of inventive concepts.

FIG. 9 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations.

As discussed above, in eMBB the UE receives downlink DL data from both the source and target node while uplink UL data is only transmitted to the target node. There are several reasons why the UL data transmission is switched to the target node:

- Simultaneous uplink transmission requires dual RF transmitter chains and/or dual FFTs which all UEs do not support
- Simultaneous uplink transmission may require that the UE UL transmit power is shared between source and target which reduces the UL SINR and hence the UL data rate.
- For intra-frequency handover, simultaneous UL transmission causes interference between the source and target cell which reduces SINR and hence the UL data rate.

On the UE side, switching the UL data transmission means that the PDCP entity will transmit all new UL PDCP SDUs to the target node using the target RLC entity. However, one open issue is how to handle the unacknowledged UL PDCP SDUs, i.e. the UL PDCP SDUs which the PDCP entity has already submitted to the source RLC entity but which have not yet been acknowledged by the source node.

To provide/ensure that the unacknowledged UL PDCP SDUs are delivered to the network while reducing/minimizing the amount of simultaneous UL transmissions, one approach is to re-transmit the unacknowledged UL PDCP SDUs to the target node using the target RLC entity and flush the source RLC entity's transmission buffer. Re-transmitting the UL PDCP SDUs to the target is more reliable as the link quality is usually better for the target access node than for the source access node at the time of handover. Flushing the source RLC entity's transmission buffer also ensures that no more UL data is transmitted to source node, thereby reducing the amount of simultaneous UL transmissions.

However, flushing the transmission buffer implies that the source RLC entity will not be able to accept any new PDCP PDUs for transmission as this may cause e.g., RLC sequence numbers to be re-used. This in turn implies that the PDCP entity will not be able to continue to transmit PDCP Control PDUs (e.g. ROHC feedback) to the source node. If the data radio bearer is using ROHC, this may cause the DL transmission from the source node to fail due to decompression errors.

A better approach which may reduce/avoid the ROHC problem mentioned above is to re-transmit the unacknowledged UL PDCP SDUs to the target using the target RLC entity but still allow the RLC entity to transmit the PDCP PDUs that are stored in its transmission buffer (or at least the PDCP PDUs for which transmission has been started) to the source node. Allowing the source RLC entity to continue to transmit will result in more simultaneous UL transmissions but is necessary if the PDCP entity should be able to send ROHC feedback to the source node. Another advantage is that the source RLC entity will be able to finish ongoing UL transmissions that have already been partially completed (e.g. if HARQ re-transmission is ongoing for a PDCP PDU or if a PDCP PDU has been segmented by RLC). In this way, the energy and UL resources spent on the previous transmission/re-transmissions will not go to waste. If the source link is still reliable and the UE is confident that the UL transmissions in the source cell will succeed, the PDCP entity could also potentially omit re-transmitting the unacknowledged PDCP SDU to the target node and instead rely on the (re-)transmissions performed by the source RLC entity.

Some embodiments of inventive concepts may address/resolves uncertainty of how the UE handles re-transmission of UL PDCP SDUs which have not been acknowledged by the source access node from the point in time when new UL PDCP SDUs are only transmitted to the target access node. Furthermore, it ensures lossless UL transmission during eMBB handover by re-transmitting the PDCP SDUs which have not been acknowledged by the source access node to the target access node. Re-transmitting the UL PDCP SDUs to the target is more reliable as the link quality is usually better for the target access node than for the source access node at the time of handover. Some embodiments of inventive concepts may also enable the UE to continue to transmit PDCP Control PDUs (e.g. ROHC feedback) to the source node by not flushing the source RLC entity's transmission buffer. Being able to send ROHC feedback may be useful/essential for the DL operation for data radio bearers using ROHC.

Figure 1:
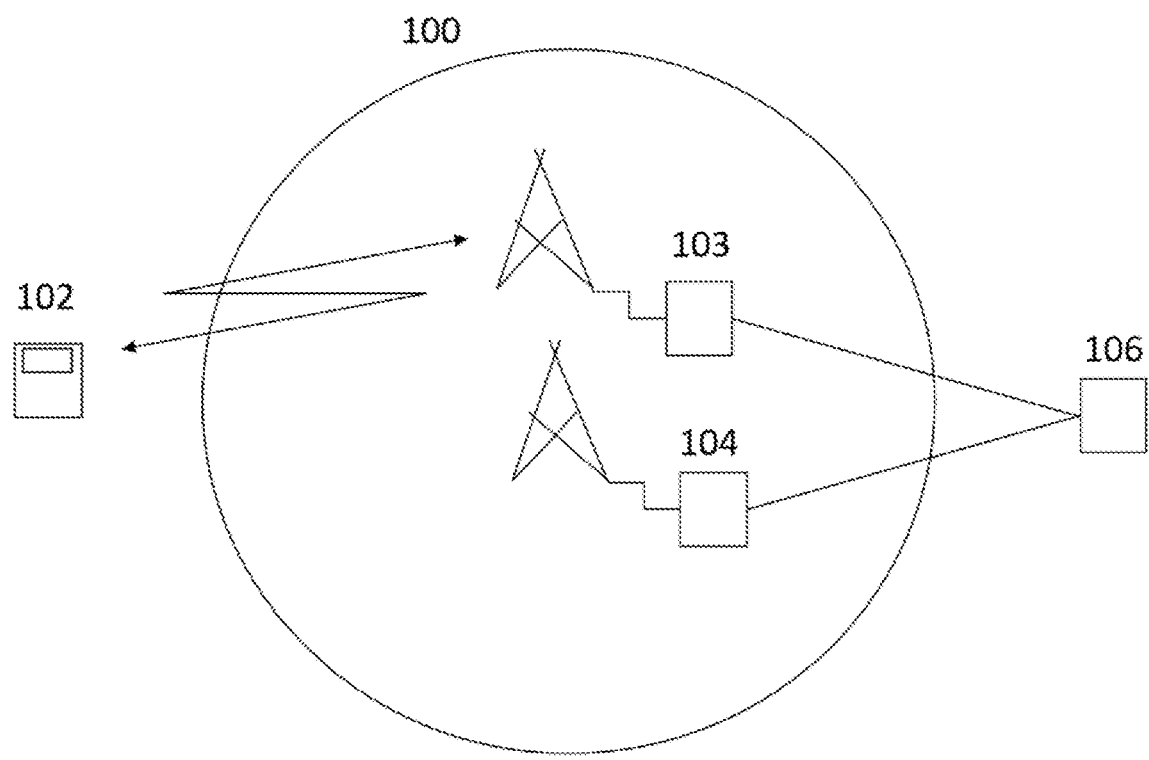
FIG. 1 is a diagram illustrating a wireless communication system.
Figure 2A:
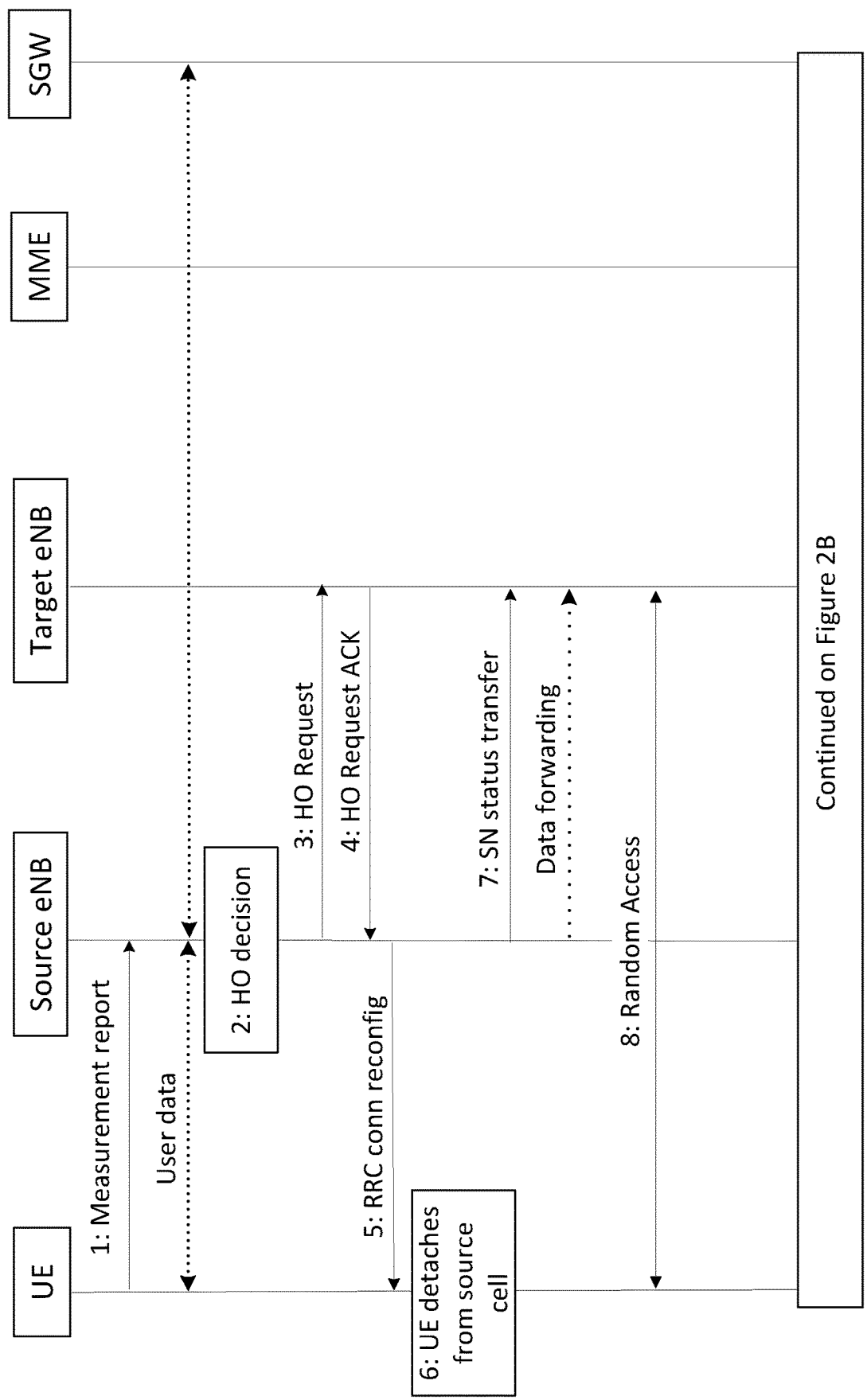
FIGS. 2A and 2B provide a message diagram illustrating Handover in LTE.
Figure 2B:
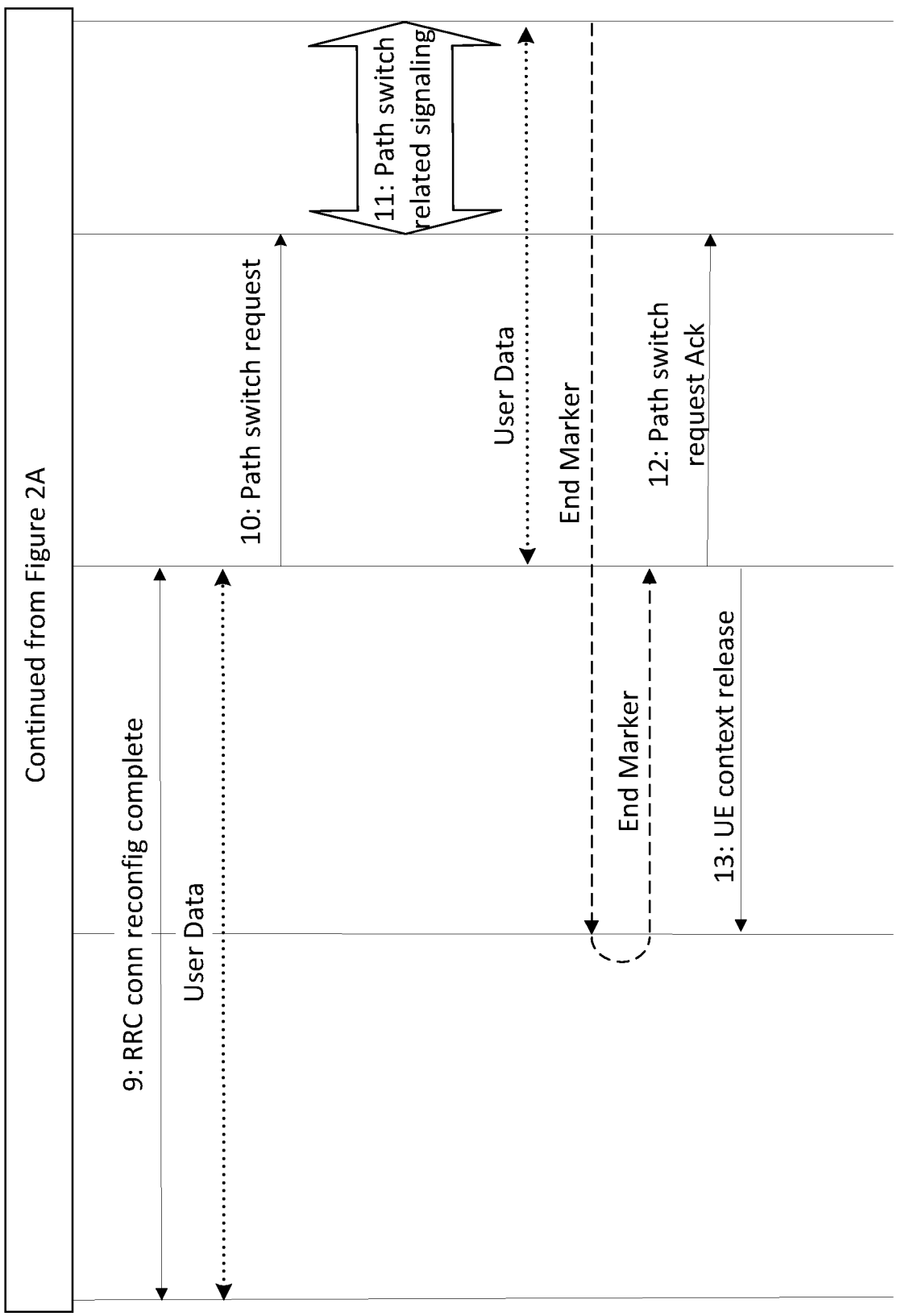
Figure 3A:
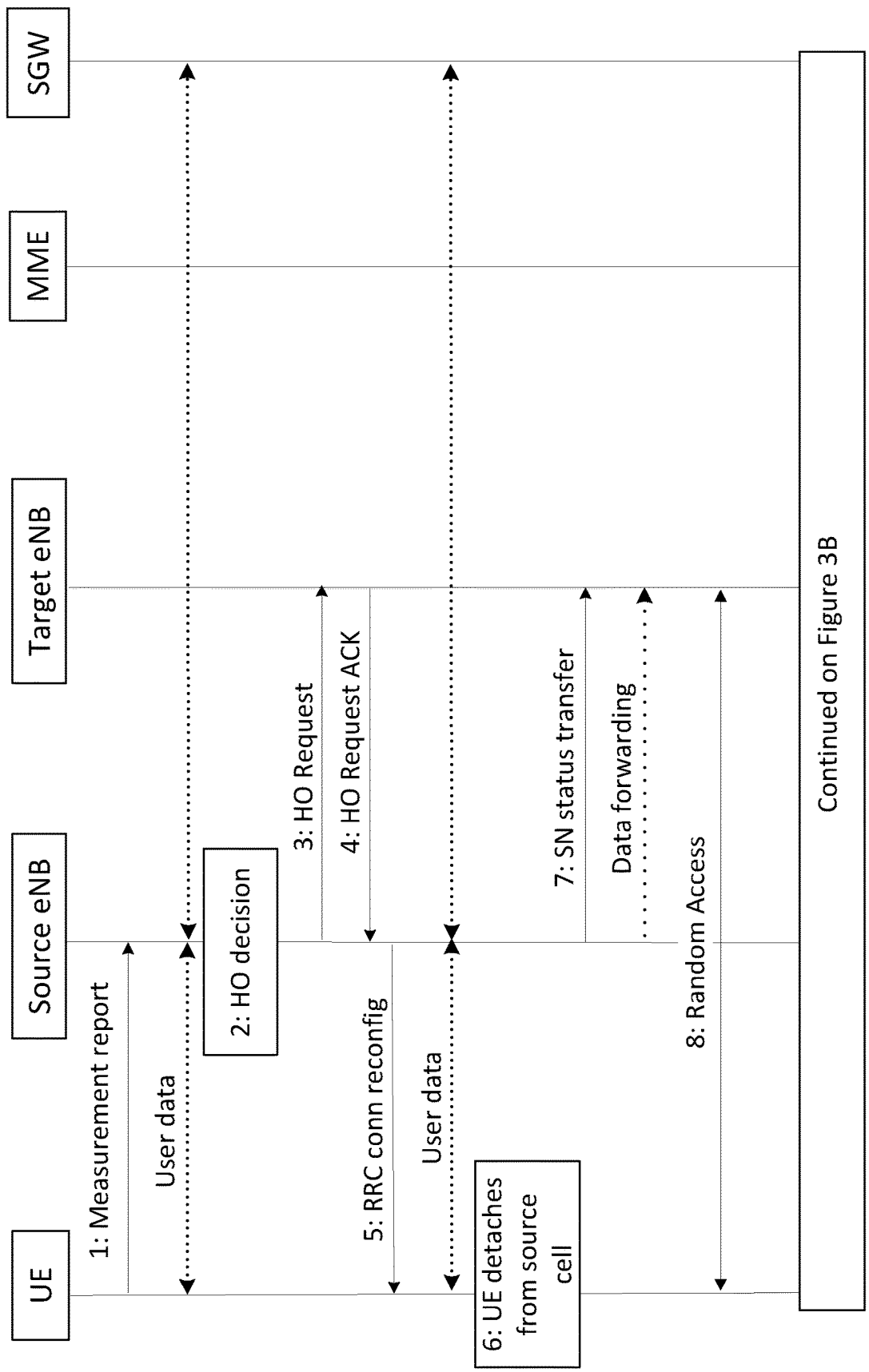
FIGS. 3A and 3B provide a message diagram illustrating Make-Before-Break handover.
Figure 3B:
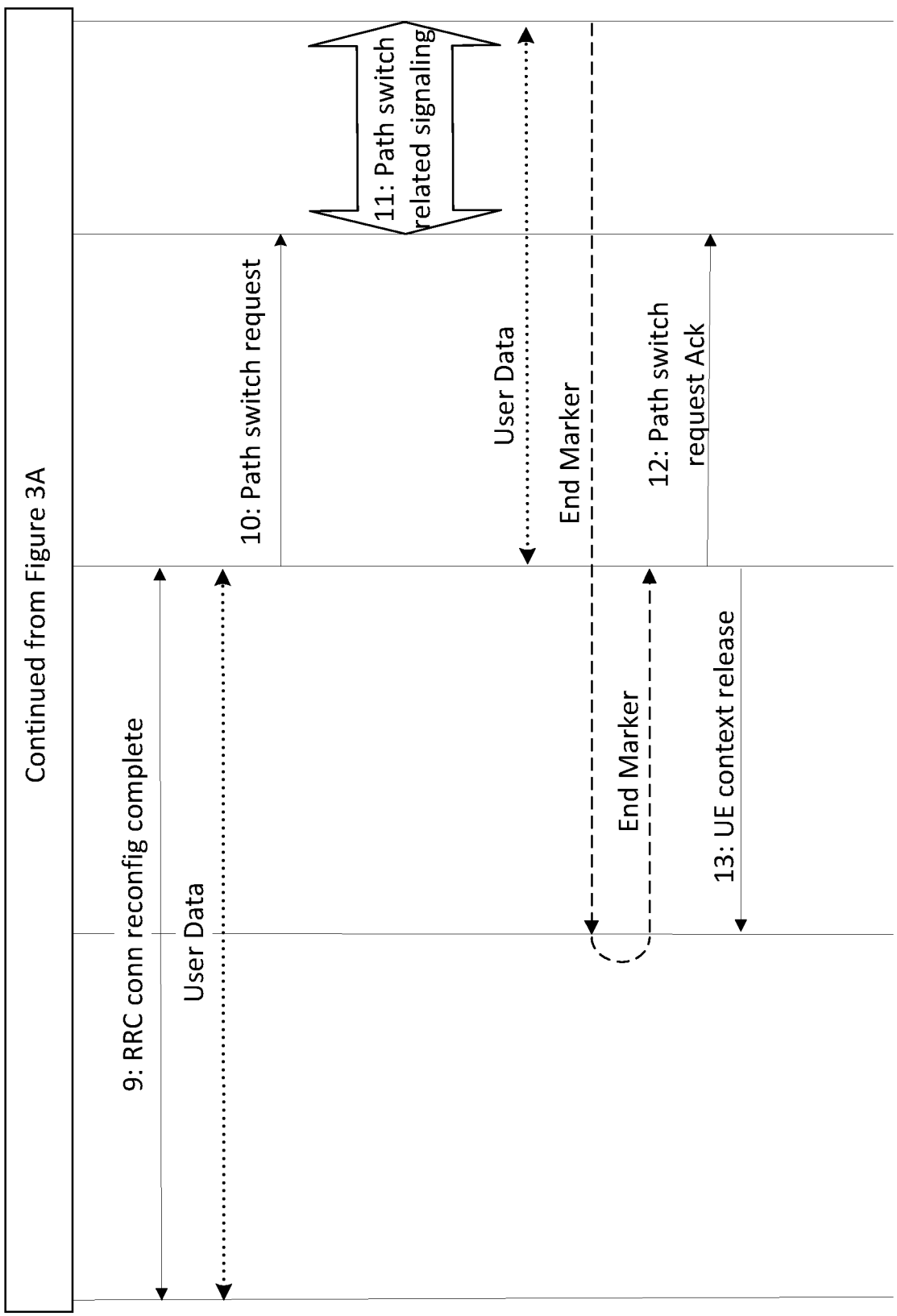
Figure 4A:
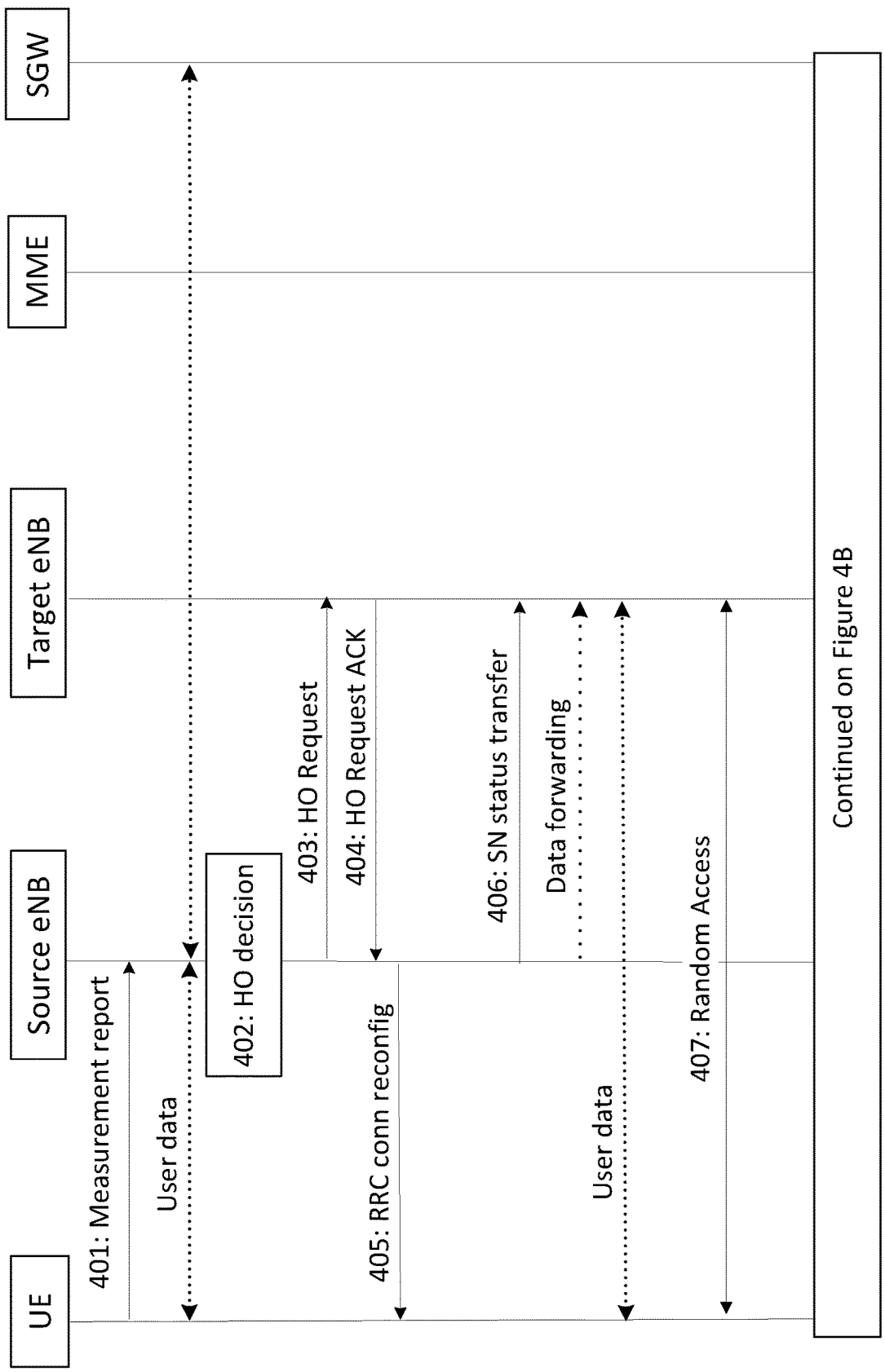
FIGS. 4A and 4B provide a message diagram illustrating Enhanced Make-Before-Break handover for LTE.
Figure 4B:
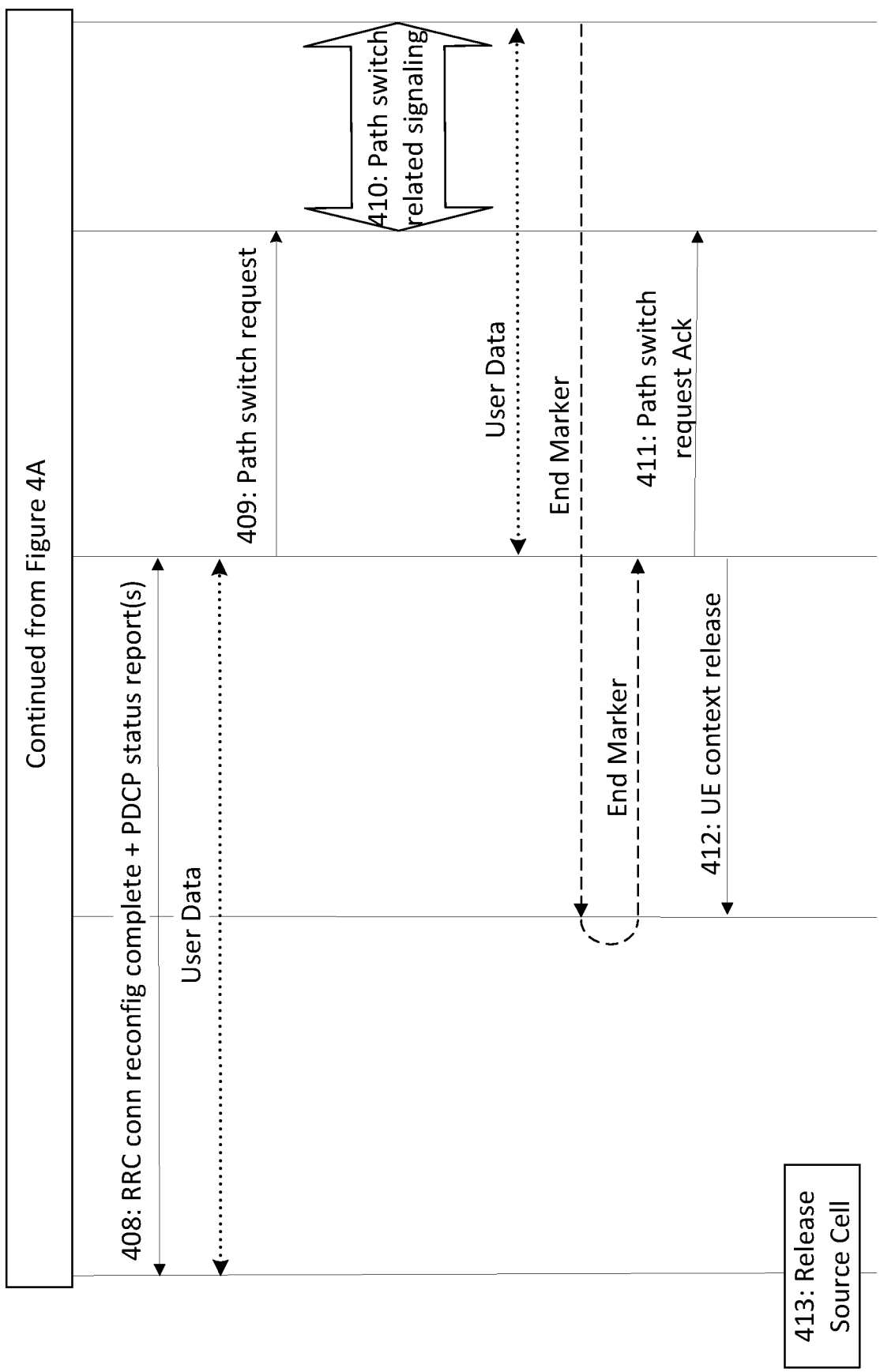
Figure 5:
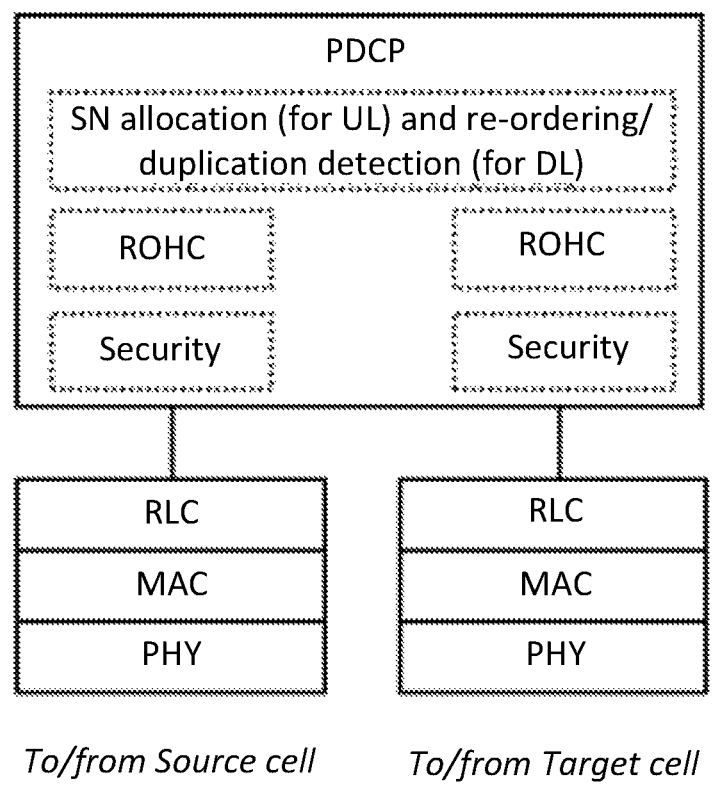
FIG. 5 is a block diagram illustrating a user plane stack for Enhanced Make-Before-Break on the UE side.
Figure 6:
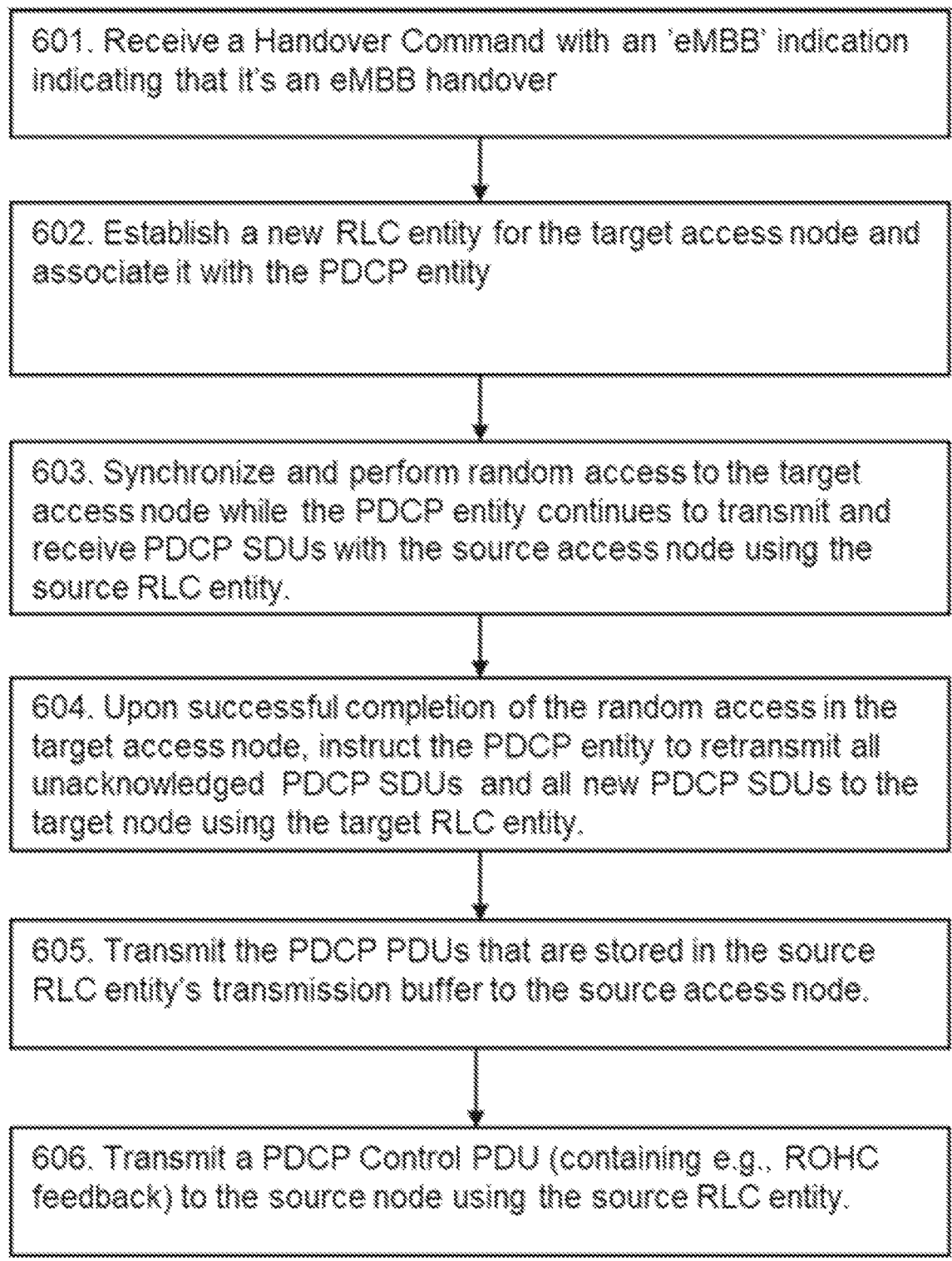
FIG. 6 is a flowchart illustrating UE operations according to some embodiments of inventive concepts.

Operations performed by the UE are illustrated in the flow chart of FIG. 6 in accordance with some embodiments of inventive concepts.

FIG. 6 illustrates operations (abbreviated as Op.) performed by the UE according to some embodiments of inventive concepts, and operations thereof are discussed below.

Op. 601: The UE is connected to the source access node and has an established user plane radio bearer mapped on RLC-AM when it receives a Handover Command with an 'eMBB' indication which indicates that the handover is an eMBB handover.

Op. 602: The UE establishes a new RLC entity for the target access node and associates it with the PDCP entity for the user plane radio bearer. Thus, the PDCP entity has two associated RLC entities—one for the source access node and one for the target access node.

Op. 603: The UE synchronizes and performs random access with the target access node in the target cell. During this time the PDCP entity continues to transmit and receive PDCP SDUs in the source cell to/from the source access node using the source RLC entity.

Op. 604: Upon successful completion of the random access to the target access node, the UE instructs the PDCP entity to switch the UL from source to target which in turn triggers the PDCP entity to retransmit all unacknowledged PDCP SDUs (i.e. PDCP SDUs which have been submitted to source RLC entity but which have not been confirmed as received by the source access node) and all new PDCP SDUs to the target node using the target RLC entity. As an alternative, if the source link is still reliable and the UE is confident that the UL transmissions in the source cell will succeed or if some UL packet loss is acceptable, the PDCP entity could potentially omit re-transmitting the unacknowledged PDCP SDU to the target node and instead rely on the re-transmissions performed by the source RLC entity as part of operation 605.

Op. 605: The UE transmits the PDCP PDUs that are stored in the source RLC entity's transmission buffer at the time of the UL switch to the source node. As an alternative, the UE could choose to only transmit the PDCP PDUs for which transmission has been started by the RLC entity and which have been assigned an RLC SN. The important thing is that RLC entity does not re-use a previously assigned SN if a new PDCP PDU is received from the PDCP entity.

Op. 606: After the UL switch, the UE can still transmit PDCP Control PDUs (containing e.g., ROHC feedback) to the source node. The PDCP Control PDUs are generated by the PDCP entity and are transmitted to the source node using the source RLC entity.

Note that in the description above, the completion of the random access is used as a trigger to switch the UL. This is only an example and one could also consider other triggers such as the reception of the first UL grant in the target cell or the expiry of some specific timer. Yet other triggers could be the transmission of the Handover Complete message to the target access node (i.e. the RRCConnectionReconfigurationComplete message in LTE and the RRCReconfigurationComplete message in NR) or confirmation of successful reception in the target node of the Handover Complete message (e.g. based on HARQ or RLC feedback) or the reception of the first UL grant after successful transmission of the Handover Complete message where this UL grant may be used for UL user data (note that the latter trigger alternative may not be possible to use when the UE does not have any UL user data to transmit in the target cell, in which case it may not receive any UL grant after successful transmission of the Handover Complete message). Using the expiration of a timer as the trigger, as suggested as one alternative above, could e.g. be a timer started when any of the herein suggested triggers occur or when random access is initiated or completed in the target cell or when the Handover Command (with eMBB indication) is received.

Also note that there are several ways in which the UE can instruct the PDCP and RLC entities to perform the actions described in operations 604-606. For example, the RRC entity/layer in the UE could instruct the PDCP and RLC entities to perform the actions upon completion of the random access in the target access node. The UE or RRC entity/layer in the UE could also instruct the PDCP entity which in turn would instruct the source and target RLC entity. Exactly how such inter-layer/entity instructions/information is passed is UE internal and any specification of it would just be an indication of the expected resulting UE behavior.

Also note that parts of the method described above can also be applied to data radio bearers mapped on RLC-UM. The main difference is that since PDCP SDUs are not acknowledged in the RLC-UM case the PDCP entity does not need to re-transmit any PDCP SDUs in operation 605.

Some embodiments of inventive concepts may provide a method performed by a UE for handling handover from a source access node to a target access node, the method comprising:
  receiving a handover command from the source access node while having a connection to the source access node
  establishing a connection to the target access node while sending/receiving UL/DL PDCP SDUs to/from the source access node using a source RLC entity
  transmitting new UL PDCP SDUs to the target access node using the target RLC entity
  transmitting the UL PDCP PDUs that are stored in the source RLC entity's transmission buffer at the time of the UL switch to the source node In the method described above, in addition all unacknowledged PDCP SDUs may be re-transmitted to the target node using the target RLC entity.

In the method as described above, in addition a PDCP Control PDU may be transmitted to the source access node using the source RLC entity.

Operations of the wireless device 300 (implemented using the structure of the block diagram of FIG. 7) will now be discussed with reference to the flow chart of FIG. 10 according to some embodiments of inventive concepts. For example, modules may be stored in memory 305 of FIG. 7, and these modules may provide instructions so that when the instructions of a module are executed by respective wireless device processing circuitry 303 (also referred to as a processor), processing circuitry 303 performs respective operations of the flow chart.

At block 1001, processing circuitry 303 may provide a connection with a source access node (through transceiver 301) using a source Radio Link Control RLC entity.

At block 1005, processing circuitry 303 may receive a handover command from the source access node (through transceiver 301) while providing the connection with the source access node.

At block 1009, processing circuitry 303 may establish a connection with a target access node (through transceiver 301) using a target RLC entity responsive to receiving the handover command. Moreover, a Packet Data Convergence Protocol PDCP entity may be provided for the source and target access nodes.

At block 1011, processing circuitry 303 may receive new uplink data at the target RLC entity from the PDCP entity after establishing the connection with the target access node.

At block 1015, processing circuitry 303 may transmit the new uplink data from the target RLC entity (through transceiver 301) to the target access node after establishing the connection.

At block 1017, processing circuitry 303 may retransmit unacknowledged uplink data from the source RLC entity to the target access node after establishing the connection with the target access node.

At block 1019, processing circuitry may transmit uplink data (through transceiver 301) from a transmission buffer of the source RLC entity to the source access node after establishing the connection with the target access node. For example, the uplink data may be transmitted to the source access node after establishing the connection with the target access node and after un UpLink UL switch from the source access node to the target access node. Moreover, the uplink data stored in the transmission buffer of the source RLC entity may include PDCP data received by the source RLC entity from the PDCP entity before establishing the connection with the target access node. For example, the PDCP data may include a PDCP Control PDU, such as Robust Header Compression ROHC feedback.

According to some embodiments, establishing the connection at block 1009 may include transmitting a random access preamble (through transceiver 301) to the target access node, receiving a random access response (through transceiver 301) from the target access node, and transmitting a handover complete message (through transceiver 301) to the target access node. In such embodiments, transmitting the uplink data to the source access node after establishing the connection with the target access node at block 1019 may include transmitting the uplink data to the source node after at least one of receiving the random access response and/or transmitting the Handover Complete message.

Figure 10:
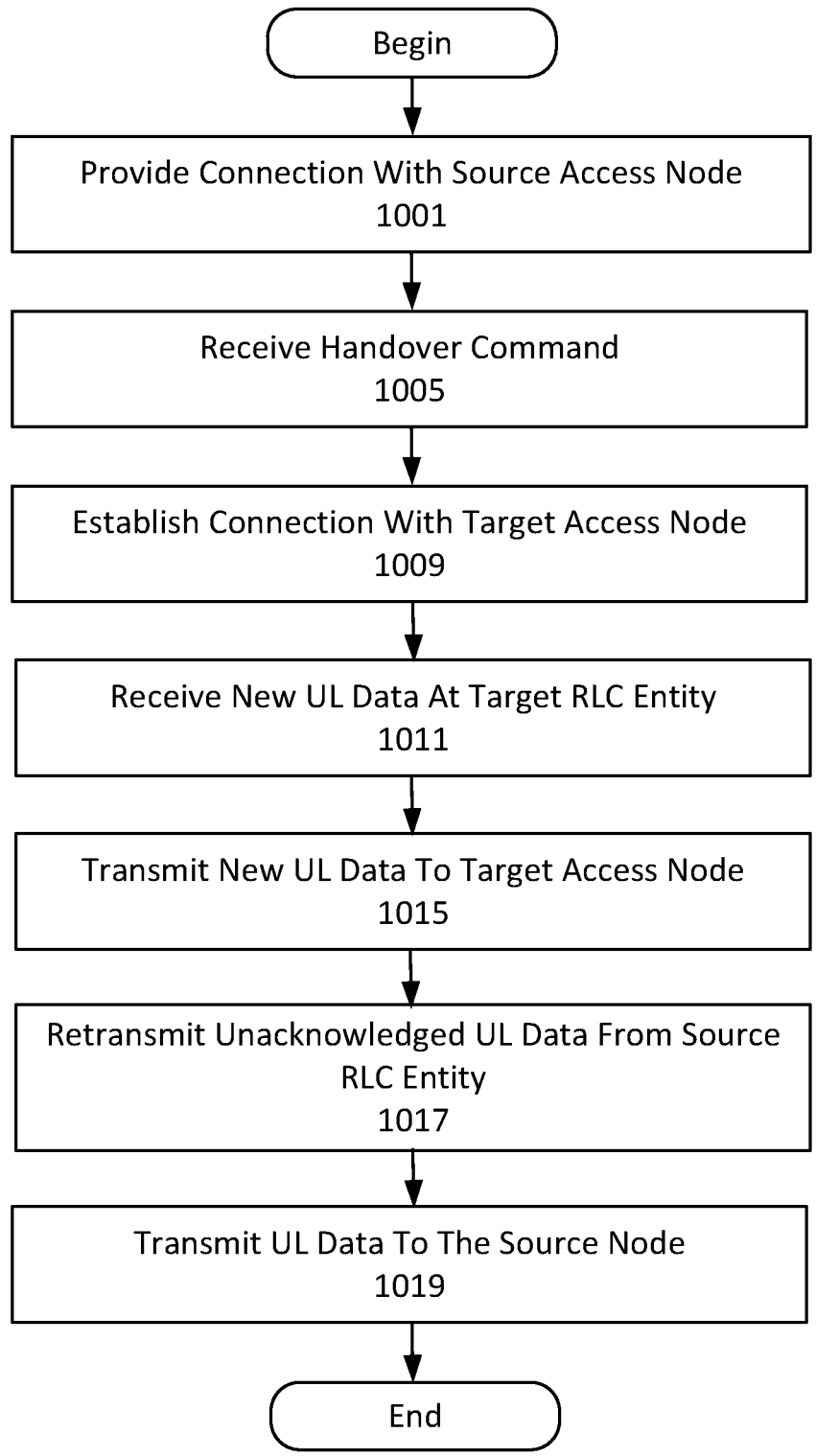
FIG. 10 is a flow chart illustrating operations of a wireless device according to some embodiments of inventive concepts.

Various operations from the flow chart of FIG. 10 may be optional with respect to some embodiments of wireless devices and related methods. Regarding methods of example embodiment 1 (set forth below), for example, operations of blocks 1011 and 1015 of FIG. 10 may be optional.

Example embodiments are discussed below.

Embodiment 1. A method of operating a wireless device, the method comprising: providing (1001) a connection with a source access node; receiving (1005) a handover command from the source access node while providing the connection with the source access node; establishing (1009) a connection with a target access node responsive to receiving the handover command; and transmitting (1019) uplink data to the source access node after establishing the connection with the target access node.

Embodiment 2. The method of Embodiment 1, wherein providing the connection with the source access node comprises providing the connection with the source access node using a source Radio Link Control, RLC, entity, and wherein establishing the connection with the target access node comprises establishing the connection with the target access node using a target RLC entity.

Embodiment 3. The method of Embodiment 2, wherein transmitting uplink data to the source access node after establishing the connection with the target access node comprises transmitting uplink data stored in a transmission buffer of the source RLC entity to the source access node after establishing the connection.

Embodiment 4. The method of Embodiment 3, wherein a Packet Data Convergence Protocol, PDCP, entity is provided for the source and target access nodes, wherein the uplink data stored in the transmission buffer of the source RLC entity comprises PDCP data received by the source RLC entity from the PDCP entity before establishing the connection with the target access node.

Embodiment 5. The method of Embodiment 4, the method further comprising: receiving (1011) new uplink data at the target RLC entity from the PDCP entity after establishing the connection with the target access node; and transmitting (1015) the new uplink data from the target RLC entity to the target access node after establishing the connection.

Embodiment 6. The method of any of Embodiments 1-5, wherein establishing the connection comprises transmitting a random access preamble to the target access node, receiving a random access response from the target access node, and transmitting a handover complete message to the target access node, and wherein transmitting the uplink data to the source access node after establishing the connection with the target access node comprises transmitting the uplink data to the source node after at least one of receiving the random access response and/or transmitting the Handover Complete message.

Embodiment 7. The method of any of Embodiments 1-6, wherein the handover command includes an indication that the handover is an enhanced make-before-break handover.

Embodiment 8. The method of any of Embodiments 1-7, wherein the handover command includes an identifier for the target access node.

Embodiment 9. The method of any of Embodiments 1-8, wherein establishing the connection comprises establishing the connection with the target access node while transmitting uplink data to the source node.

Embodiment 10. The method of any of Embodiments 1-9, wherein transmitting the uplink data to the source access node after establishing the connection with the target access node comprises transmitting a Packet Data Convergence Protocol, PDCP, Control Packet Data Unit, PDU, to the source access node after establishing the connection with the target access node.

Embodiment 11. The method of Embodiment 10, wherein the PDCP Control PDU comprises Robust Header Compression, ROHC, feedback.

Embodiment 12. A method performed by a UE for handling handover from a source access node to a target access node, the method comprising: receiving a handover command from the source access node while having a connection to the source access node; establishing a connection to the target access node while sending/receiving UL/DL PDCP SDUs to/from the source access node using a source RLC entity; transmitting new UL PDCP SDUs to the target access node using a target RLC entity; and transmitting UL PDCP PDUs that are stored in transmission buffer of the source RLC at a time of an UL switch to the source node.

Embodiment 13. The method of Embodiment 12, wherein in all unacknowledged PDCP SDUs are re-transmitted to the target node using the target RLC entity.

Embodiment 14. The method of any of Embodiments 12-13, wherein a PDCP Control PDU is transmitted to the source access node using the source RLC entity.

Embodiment 15. A wireless device (300) comprising: processing circuitry (303); and memory (305) coupled with the processing circuitry, wherein the memory includes instructions that when executed by the processing circuitry causes the wireless device to perform operations according to any of Embodiments 1-14.

Embodiment 16. A wireless device (300) adapted to perform according to any of Embodiments 1-14.

Embodiment 17. A computer program comprising program code to be executed by processing circuitry (303) of a wireless device (300), whereby execution of the program code causes the wireless device (300) to perform operations according to any of embodiments 1-14.

Embodiment 18. A computer program product comprising a non-transitory storage medium including program code to be executed by processing circuitry (303) of a wireless device (300), whereby execution of the program code causes the wireless device (300) to perform operations according to any of embodiments 1-14.

Explanations are provided below for various abbreviations/acronyms used in the present disclosure.

| Abbreviation | Explanation |
| --- | --- |
| 3GPP | 3rd Generation Partnership Project |
| 5G | 5th Generation |
| 5GS | 5G System |
| 5GC | 5G Core network |
| AMF | Access and Mobility Management Function |
| CHO | Conditional Handover |
| CN | Core Network |
| C-RNTI | Cell RNTI |
| CU | Central Unit |
| DL | Downlink |
| DU | Distributed Unit |
| eICIC | Enhanced Inter-Cell Interference Coordination |
| eNB | Evolved Node B |
| eMBB | Enhanced Make-Before-Break |
| E-UTRAN | Evolved Universal Terrestrial Access Network |
| EPC | Evolved Packet Core network |
| gNB | 5G Node B |
| HARQ | Hybrid Automatic Repeat Request |
| HO | Handover |
| ICIC | Inter-Cell Interference Coordination |
| LTE | Long-term Evolution |
| MAC | Medium Access Control |
| MBB | Make-Before-Break |

| Abbreviation | Explanation |
| --- | --- |
| MME | Mobility Management Entity |
| NCC | Next Hop Chaining Counter |
| NG | The interface/reference point between the RAN and the CN in 5G/NR. |
| NG-C | The control plane part of NG (between a gNB and an AMF). |
| NG-U | The user plane part of NG (between a gNB and a UPF). |
| NG-RAN | Next Generation Radio Access Network |
| NR | New Radio |
| PDCP | Packet Data Convergence Protocol |
| PDU | Protocol Data Unit |
| PHY | Physical layer |
| QoS | Quality of Service |
| RA | Random Access |
| RACH | Random Access Channel |
| RAN | Radio Access Network |
| RAR | Random Access Response |
| RLC | Radio Link Control |
| ROHC | Robust Header Compression |
| RNTI | Radio Network Temporary Identifier |
| RRC | Radio Resource Control |
| Rx | Receive |
| S1 | The interface/reference point between the RAN and the CN in LTE. |
| S1-C | The control plane part of S1 (between an eNB and a MME). |
| S1-U | The user plane part of S1 (between an eNB and a SGW). |
| SDU | Service Data Unit |
| SGW | Serving Gateway |
| SN | Sequence Number |
| TS | Technical Specification |
| Tx | Transmit |
| UE | User Equipment |
| UL | Uplink |
| UPF | User Plane Function |
| URLLC | Ultra-Reliable Low-Latency Communication |
| X2 | The interface/reference point between two eNBs. |
| X2AP | X2 Application Protocol |
| Xn | The interface/reference point between two gNBs. |
| XnAP | Xn Application Protocol |

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 11:
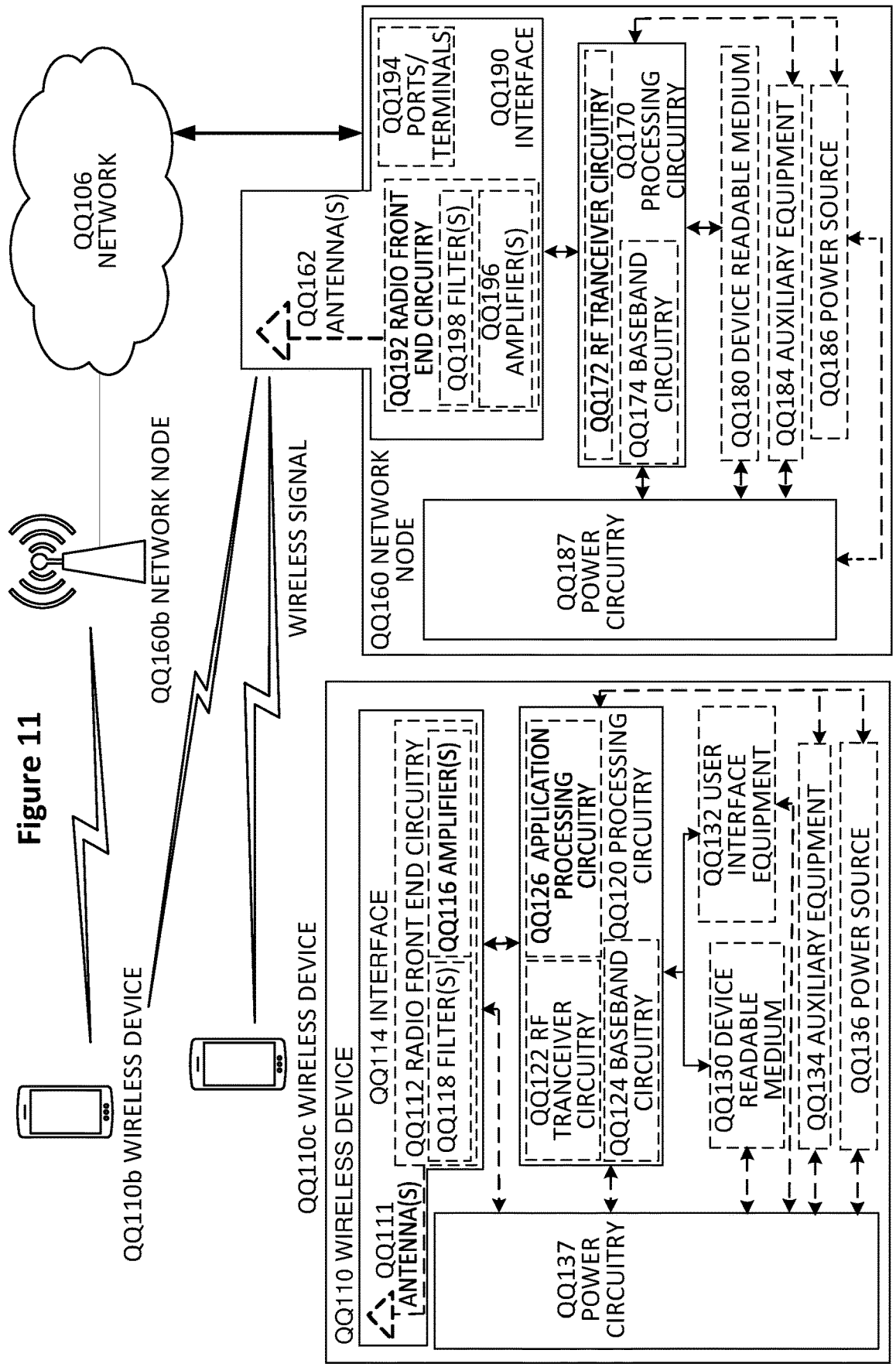
FIG. 11 is a block diagram of a wireless network in accordance with some embodiments.

FIG. 11 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band interne of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
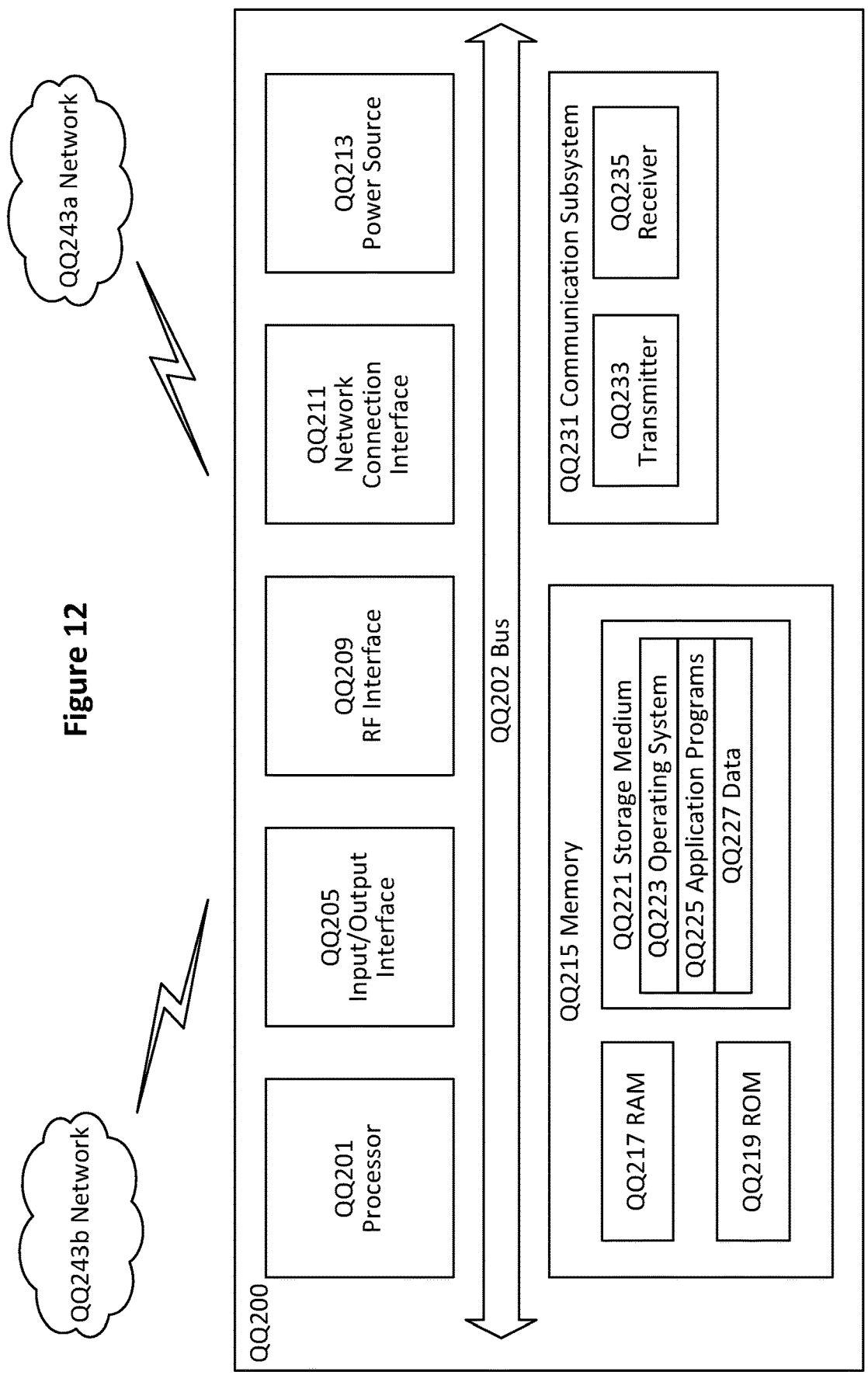
FIG. 12 is a block diagram of a user equipment in accordance with some embodiments

FIG. 12 illustrates a user Equipment in accordance with some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
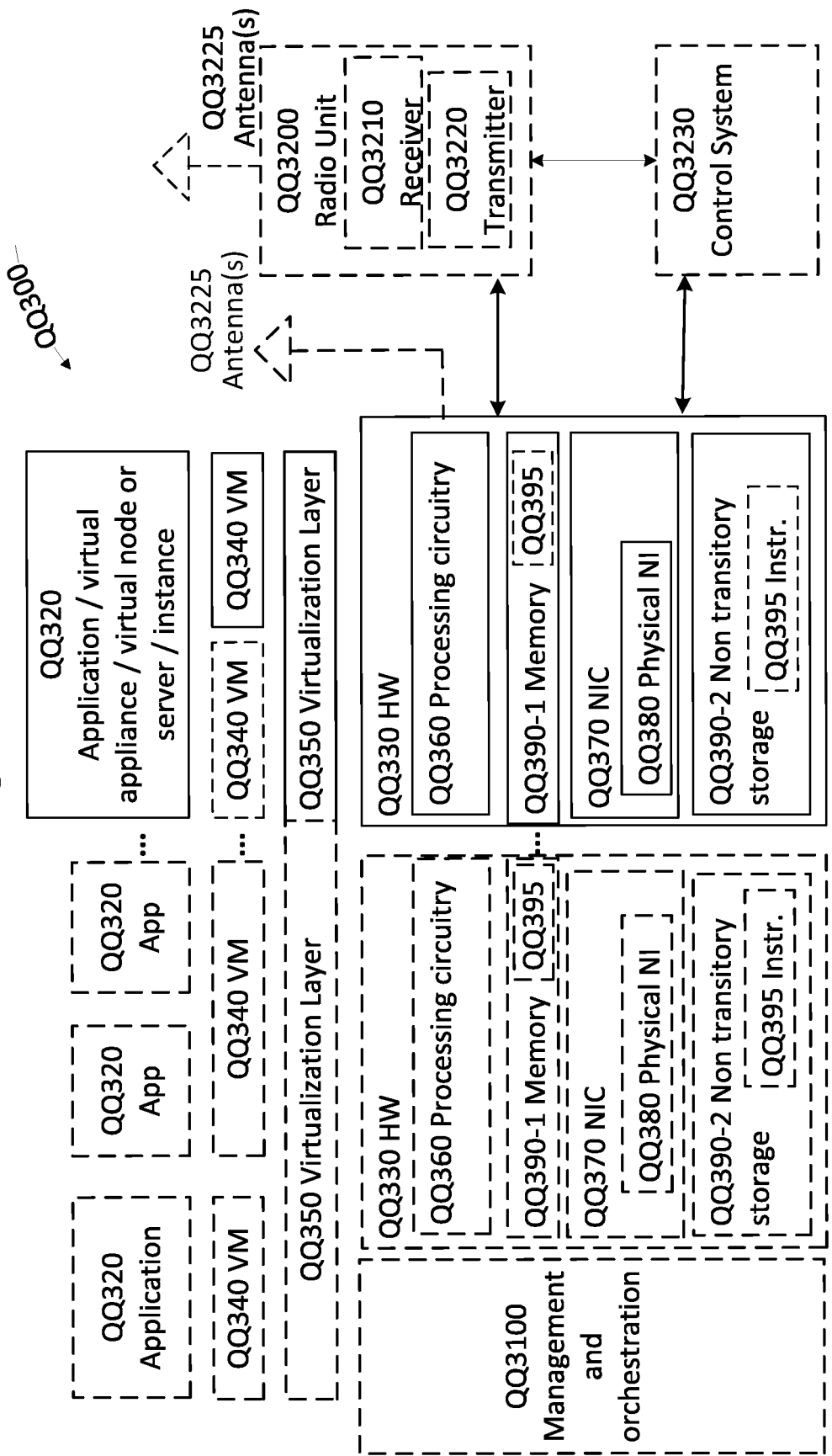
FIG. 13 is a block diagram of a virtualization environment in accordance with some embodiments.

FIG. 13 illustrates a virtualization environment in accordance with some embodiments.

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 13.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 14:
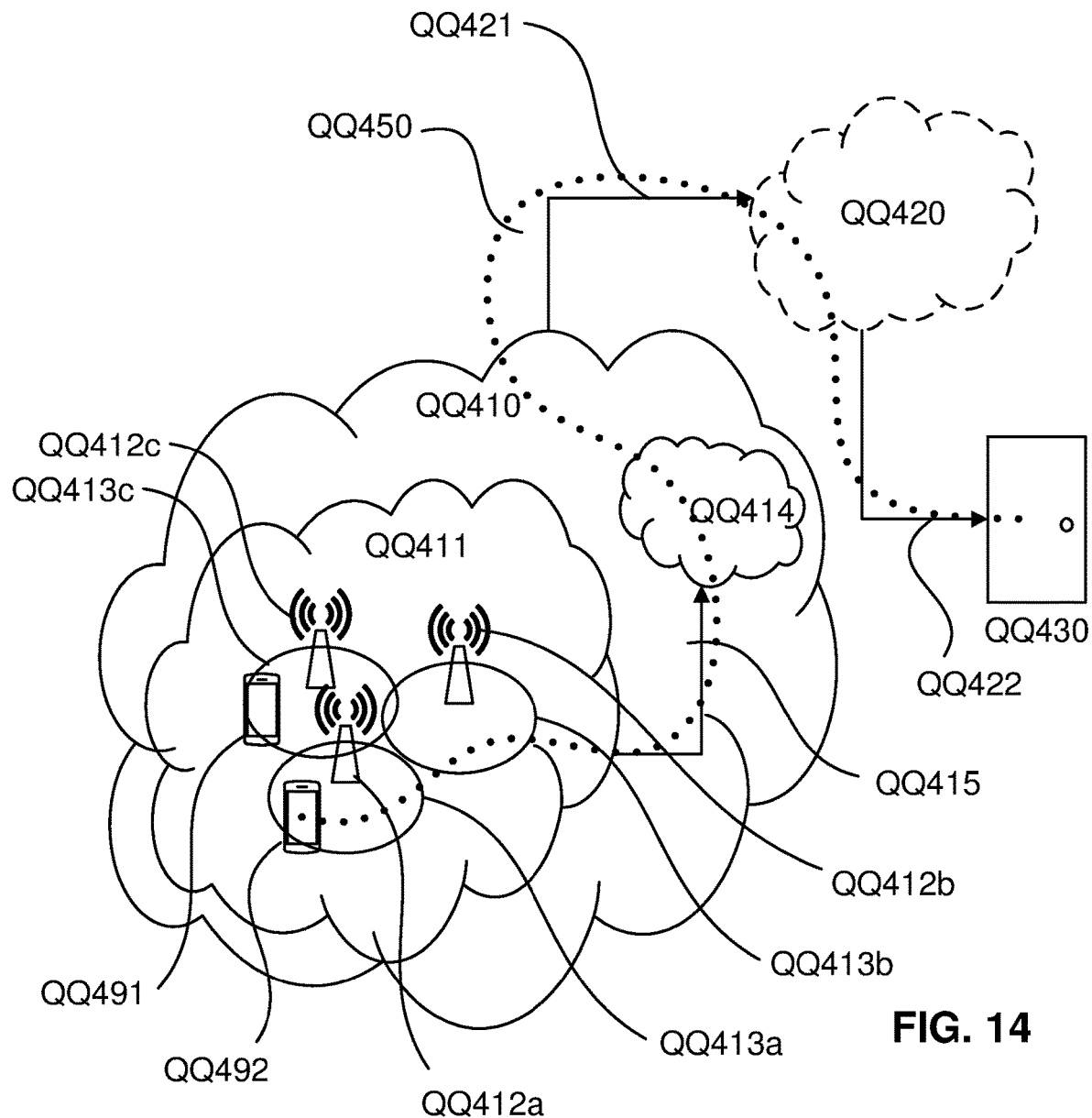
FIG. 14 is a block diagram of a telecommunication network connected via an intermediate network to a host computer in accordance with some embodiments.

FIG. 14 illustrates a telecommunication network connected via an intermediate network to a host computer in accordance with some embodiments.

With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 15:
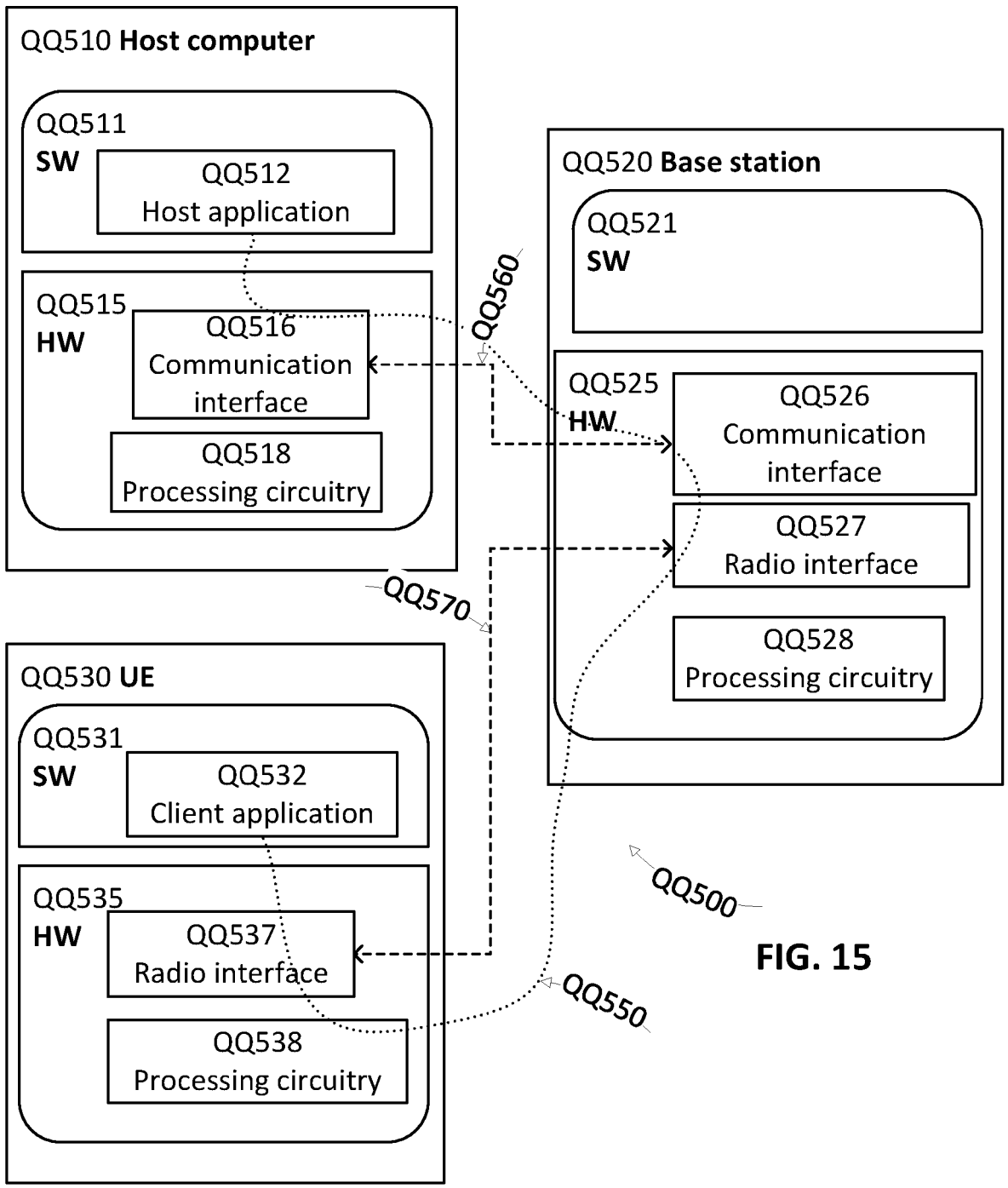
FIG. 15 is a block diagram of a host computer communicating via a base station with a user equipment over a partially wireless connection in accordance with some embodiments.

FIG. 15 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 15. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 16:
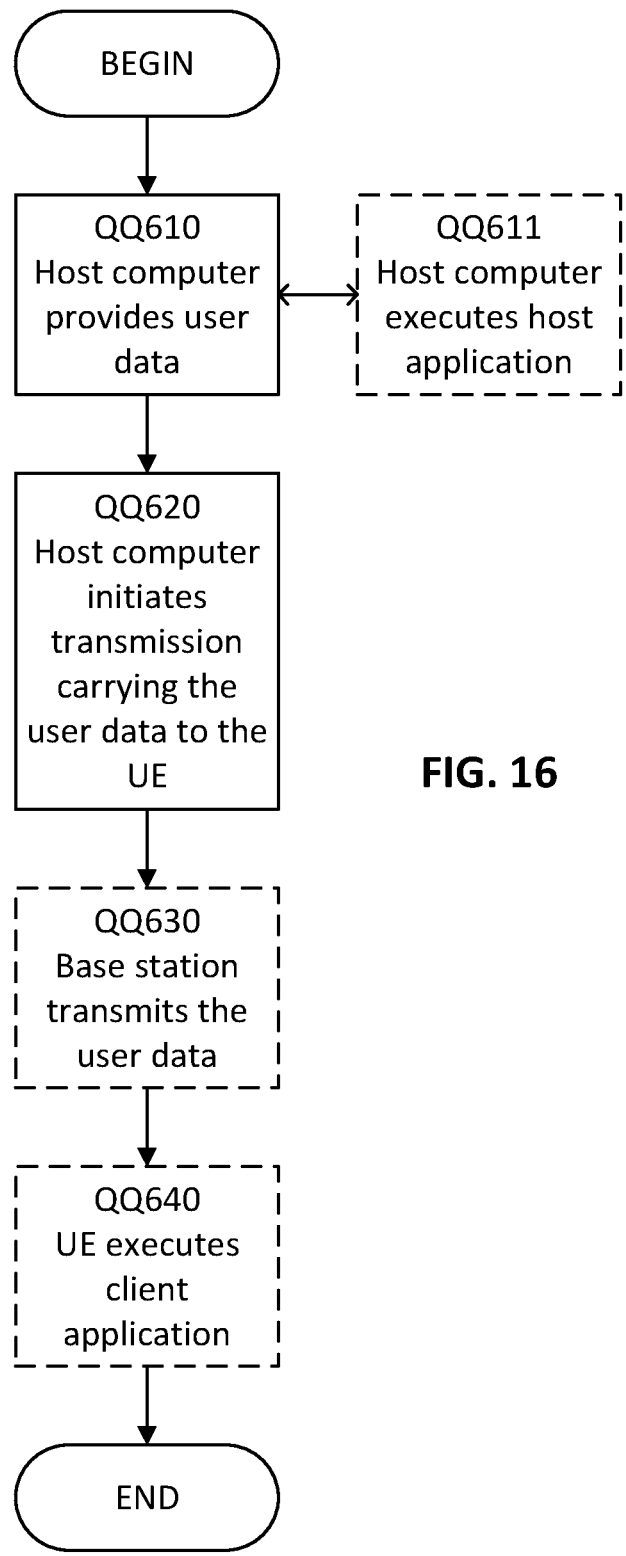
FIG. 16 is a block diagram of methods implemented in a communication system including a host computer, a base station and a user equipment in accordance with some embodiments.

FIG. 16 illustrates methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 17:
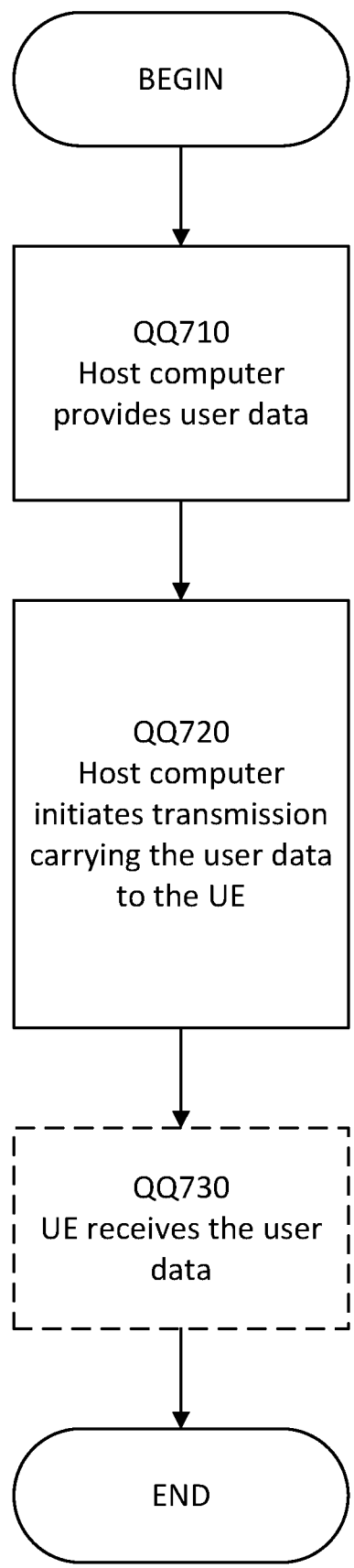
FIG. 17 is a block diagram of methods implemented in a communication system including a host computer, a base station and a user equipment in accordance with some embodiments.

FIG. 17 illustrates methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 18:
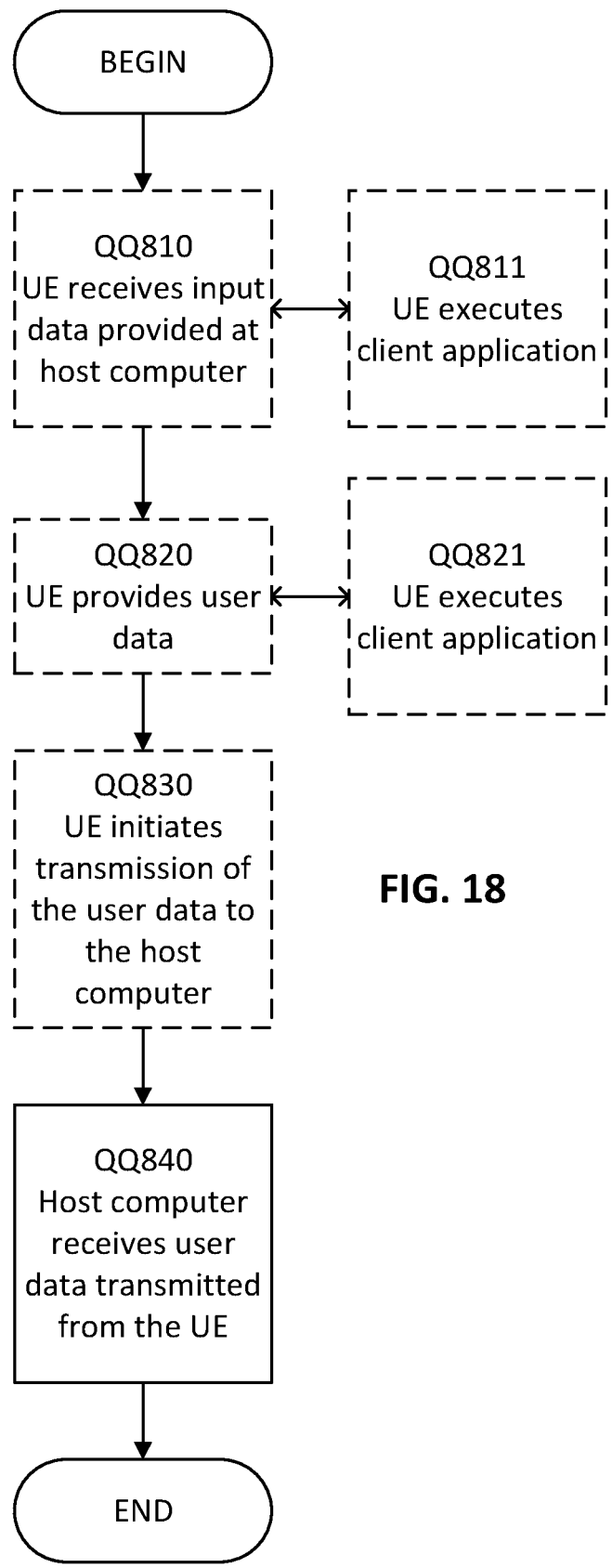
FIG. 18 is a block diagram of methods implemented in a communication system including a host computer, a base station and a user equipment in accordance with some embodiments.

FIG. 18 illustrates methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 19:
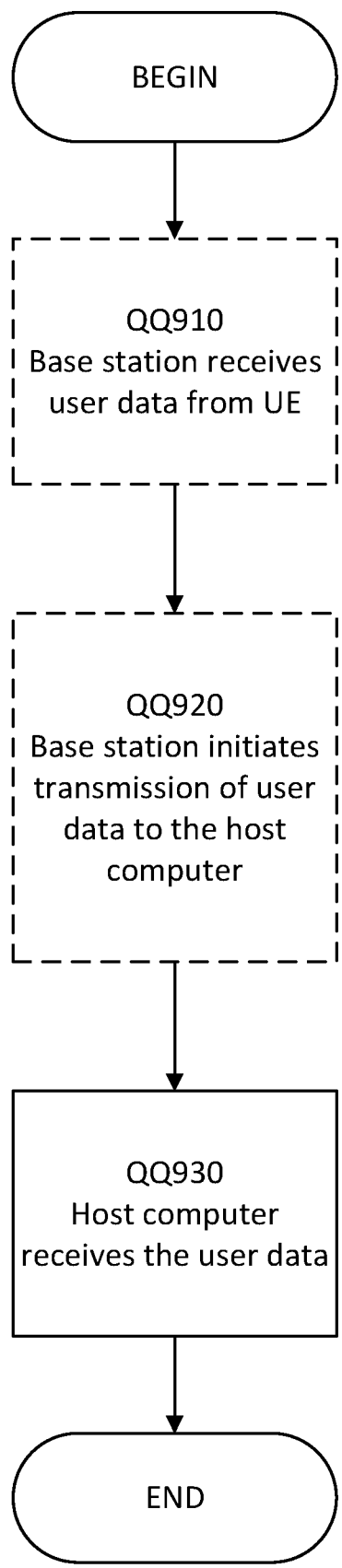
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless device, the method comprising:
receiving a handover command from a source access node while providing a connection with the source access node, the connection with the source access node being provided using a source Radio Link Control (RLC) entity;
establishing a connection with a target access node responsive to receiving the handover command, the connection with the target access node being established using a target RLC entity; and
transmitting uplink data to the source access node after establishing the connection with the target access node, the uplink data including uplink data stored in a transmission buffer of the source RLC entity.

2. The method of claim 1, wherein:
a Packet Data Convergence Protocol (PDCP) entity is provided for the source and target access nodes; and
the uplink data stored in the transmission buffer of the source RLC entity comprises PDCP data received by the source RLC entity from the PDCP entity before establishing the connection with the target access node.

3. The method of claim 2, further comprising:
receiving new uplink data at the target RLC entity from the PDCP entity after establishing the connection with the target access node; and
transmitting the new uplink data from the target RLC entity to the target access node after establishing the connection.

4. The method of claim 3, further comprising retransmitting unacknowledged uplink data from the source RLC entity to the target access node after establishing the connection with the target access node.

5. The method of claim 1, wherein:
establishing the connection with the target access node comprises:
transmitting a random access preamble to the target access node;
receiving a random access response from the target access node, and transmitting a handover complete message to the target access node; and
the uplink data is transmitted to the source access node after at least one of the following:
receiving the random access response, and transmitting the handover complete message.

6. The method of claim 1, wherein the handover command includes one or more of the following:
an indication that the handover is an enhanced make-before-break handover; and an identifier for the target access node.

7. The method of claim 1, wherein the connection is established with the target access node while transmitting uplink data to the source access node.

8. The method of claim 1, wherein the uplink data transmitted to the source access node after establishing the connection with the target access node comprises a Packet Data Convergence Protocol (PDCP) Control Packet Data Unit (PDU).

9. A wireless device comprising:
processing circuitry; and
a memory operably coupled with the processing circuitry and including instructions that, when executed by the processing circuitry, cause the wireless device to:
  receive a handover command from a source access node while providing a connection with the source access node, the connection with the source access node being provided using a source Radio Link Control (RLC) entity;
  establish a connection with a target access node responsive to receiving the handover command, the connection with the target access node being established using a target RLC entity; and
  transmit uplink data to the source access node after establishing the connection with the target access node, the uplink data including uplink data stored in a transmission buffer of the source RLC entity.

10. The wireless device of claim 9, wherein:
a Packet Data Convergence Protocol (PDCP) entity is provided for the source and target access nodes; and
the uplink data stored in the transmission buffer of the source RLC entity comprises
PDCP data received by the source RLC entity from the PDCP entity before establishing the connection with the target access node.

11. The wireless device of claim 10, wherein the memory also includes instructions that, when executed by the processing circuitry, cause the wireless device to:
  receive new uplink data at the target RLC entity from the PDCP entity after establishing the connection with the target access node; and
  transmit the new uplink data from the target RLC entity to the target access node after establishing the connection.

12. The wireless device of claim 11, the memory also includes instructions that, when executed by the processing circuitry, cause the wireless device to retransmit unacknowledged uplink data from the source RLC entity to the target access node after establishing the connection with the target access node.

13. The wireless device of claim 9, wherein:
the executed instructions cause the wireless device to establish the connection with the target access node by:
  transmitting a random access preamble to the target access node;
  receiving a random access response from the target access node, and transmitting a handover complete message to the target access node; and
the executed instructions cause the wireless device to transmit the uplink data to the source access node after at least one of the following:
  receiving the random access response, and transmitting the handover complete message.

14. The wireless device of claim 9, wherein the handover command includes one or more of the following:
an indication that the handover is an enhanced make-before-break handover; and an identifier for the target access node.

15. The wireless device of claim 9, wherein the connection is established with the target access node while transmitting uplink data to the source access node.

16. The wireless device of claim 9, wherein the uplink data transmitted to the source access node after establishing the connection with the target access node comprises a Packet Data Convergence Protocol (PDCP) Control Packet Data Unit (PDU).

17. A non-transitory storage medium including executable program code that, when executed by processing circuitry of a wireless device, causes the wireless device to perform operations corresponding to the method of claim 1.

* * * * *